(12) United States Patent
Ko

(10) Patent No.: US 12,344,126 B2
(45) Date of Patent: Jul. 1, 2025

(54) BRAKING SYSTEM OF VEHICLE CAPABLE OF REGENERATIVE BRAKING AND HYDRAULIC BRAKING AND CONTROLLING METHOD THEREOF

(71) Applicant: HYUNDAI MOBIS Co., Ltd., Seoul (KR)

(72) Inventor: Ji Weon Ko, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 490 days.

(21) Appl. No.: 17/678,614

(22) Filed: Feb. 23, 2022

(65) Prior Publication Data
US 2022/0281322 A1 Sep. 8, 2022

(30) Foreign Application Priority Data

Feb. 23, 2021 (KR) .................. 10-2021-0023791

(51) Int. Cl.
*B60T 13/00* (2006.01)
*B60L 7/26* (2006.01)
(Continued)

(52) U.S. Cl.
CPC ............... *B60L 7/26* (2013.01); *B60T 8/172* (2013.01); *B60T 13/586* (2013.01);
(Continued)

(58) Field of Classification Search
CPC ...... B60T 8/172; B60T 13/586; B60T 13/745; B60T 2270/604; B60T 2270/82
See application file for complete search history.

(56) References Cited

U.S. PATENT DOCUMENTS 9,421,953 B2 * 8/2016 Strengert .................. B60T 1/10
12,109,986 B2 10/2024 Ko
(Continued)

FOREIGN PATENT DOCUMENTS

CN 114789715 A 7/2022
JP 2012-081957 A 4/2012
(Continued)

OTHER PUBLICATIONS

Office Action issued on Nov. 11, 2024 in Chinese Patent Application No. 202210169901.8 with English translation.
(Continued)

*Primary Examiner* — Nicholas J Lane
(74) *Attorney, Agent, or Firm* — Morgan, Lewis & Bockius LLP

(57) ABSTRACT

A braking system is configured to perform one or more of cooperative braking or a combination of regenerative braking and hydraulic braking. The system includes a master cylinder, a reaction disc made of an elastic material and configured to compress the master cylinder, a rod assembly including an operating rod, an elastomer fixing unit, and an elastomer whose one end abuts a part of the operating rod and the other end abuts the elastomer fixing unit, an electric booster including a motor piston configured to compress a part of the reaction disc, for compressing the master cylinder by adjusting a displacement of the motor piston, and an electric controller configured to control the electric booster and perform control to brake the vehicle by using one or more of the regenerative braking and the hydraulic braking.

13 Claims, 38 Drawing Sheets

(51) Int. Cl.
B60T 8/172 (2006.01)
B60T 13/58 (2006.01)
B60T 13/74 (2006.01)

(52) U.S. Cl.
CPC ....... B60T 13/745 (2013.01); *B60T 2270/604* (2013.01); *B60T 2270/82* (2013.01)

(56) References Cited

U.S. PATENT DOCUMENTS

| | | | |
|---|---|---|---|
| 2010/0242169 A1 | 9/2010 | McNulty | |
| 2010/0242469 A1* | 9/2010 | Jungbecker | B60T 13/745 60/594 |
| 2011/0251769 A1* | 10/2011 | Weiberle | B60T 1/10 92/5 R |
| 2011/0297493 A1* | 12/2011 | Vollert | B60T 7/042 188/106 R |
| 2012/0091788 A1* | 4/2012 | Weiberle | B60T 7/042 60/568 |
| 2015/0353064 A1* | 12/2015 | Spoeri | B60T 8/4072 303/3 |
| 2018/0001880 A1* | 1/2018 | Huang | B60T 13/66 |
| 2018/0001881 A1* | 1/2018 | Huang | B60T 8/17 |
| 2020/0262409 A1* | 8/2020 | Takahashi | B60T 13/745 |
| 2020/0339091 A1* | 10/2020 | Boehm | F16H 25/20 |
| 2021/0309190 A1* | 10/2021 | Struschka | B60T 11/18 |
| 2022/0234562 A1* | 7/2022 | Ko | B60L 7/26 |

FOREIGN PATENT DOCUMENTS

| | | |
|---|---|---|
| KR | 10-2010-0103518 A | 9/2010 |
| KR | 10-2011-0095334 A | 8/2011 |

OTHER PUBLICATIONS

Office Action issued on Apr. 4, 2025 in Chinese Patent Application No. 202210169901.8 with English translation.
Office Action issued on Mar. 19, 2025 in Korean Patent Application No. 10-2021-0023791 with English translation Note: US2015-0353064A cited therein is already of record.

* cited by examiner

BRAKING SYSTEM OF VEHICLE CAPABLE OF REGENERATIVE BRAKING AND HYDRAULIC BRAKING AND CONTROLLING METHOD THEREOF

CROSS-REFERENCE TO RELATED APPLICATION

This application claims priority to and the benefit of Korean Patent Application No. 10-2021-0023791 filed on Feb. 23, 2021, and Korean Patent Application No. 10-2021-0059777 filed on May 10, 2021, the disclosure of which is incorporated herein by reference in its entirety

TECHNICAL FIELD

The present disclosure relates to a braking system of a vehicle capable of regenerative braking and hydraulic braking and a method of controlling the same.

BACKGROUND

The statements in this section merely provide background information on the present disclosure and do not necessarily constitute related art.

Regenerative braking is a way of braking that drives a motor as a generator using the driving inertia of a vehicle and uses a resistance produced by driving the motor as a braking force.

In the case of a hybrid electric vehicle (HEV), a regenerative braking unit and a hydraulic braking unit cooperate to brake the vehicle (hereinafter, "cooperative braking"), thereby providing stable braking force to the vehicle.

The vehicle further includes an electric booster unit in order to boost a driver's pedal effort. The electric booster unit uses rotational torque of an electric motor provided in the electric booster unit to boost a force applied to the inside of a master cylinder from an operating rod. Also, when generating a pedal feel, the electric booster unit is configured to give the driver a required pedal feel. Specifically, the electric booster unit is configured to generate a proper amount of pedal force corresponding to a pedal stroke as a reaction disc is compressed by the electric booster unit.

Meanwhile, when a vehicle with a conventional cooperative braking function performs regenerative braking, electronic stability control (ESC) is used to reduce hydraulic pressure by an amount compensated by regenerative braking during regenerative braking. To this end, conventional vehicles require ESC with a specification that enables cooperative control of regenerative braking and hydraulic braking. Specifically, ESC requires a pressure reducing device such as an accumulator in order to reduce hydraulic pressure, which requires a higher specification for ESC. This may lead to a cost increase.

Moreover, when regenerative braking is disabled while a vehicle with a conventional cooperative braking function is in the midst of cooperative braking, the amount of hydraulic oil in the braking system is increased using ESC, in order to increase the braking force of hydraulic braking. A pump is activated to draw oil from the master cylinder in order to increase the amount of hydraulic oil in the braking system. As a result, the pressure generated inside the master cylinder is reduced, and the driver will have an unnatural feel that the pedal force is lowered.

Meanwhile, in vehicles equipped with a regenerative braking unit and a hydraulic braking unit in the related art, a pedal force is generated by only a pedal spring only in regenerative braking. Accordingly, when an available regenerative braking period is long, a driver feels disconnection of a pedal force, so there is a problem that a sensitivity quality is deteriorated.

Further, in regenerative braking of vehicles of the related art, hydraulic pressure is decreased by the compensation amount of braking according to regenerative braking, using an electronic stability control unit (ESC). To this end, the vehicles of the related art require an ESC having specifications that can perform cooperative control of regenerative braking and hydraulic braking. In detail, an ESC additionally requires a decompressor such as an accumulator to reduce hydraulic pressure, so the specification of the ESC is increased. Accordingly, there is a problem of an increase of the manufacturing cost.

SUMMARY

In view of the above, the present disclosure primarily aims to decrease a regenerative braking force by receiving a regenerative braking interruption signal and eliminating an unnatural pedaling feel generated when a hydraulic braking force is increased by an amount equal to the decrease in a regenerative braking force.

The problems to be solved in the present disclosure are not limited to the foregoing problems, and other problems not mentioned herein would be clearly understood by one of ordinary skill in the art from the following description.

According to one aspect of this application, a braking system, configured to, when braking a vehicle, perform one or more of cooperative braking or a combination of regenerative braking and hydraulic braking, includes a master cylinder; a reaction disc made of an elastic material and configured to compress the master cylinder; a rod assembly comprising an operating rod whose displacement is adjusted based on an amount of a force applied on a brake pedal, an elastomer fixing unit, and an elastomer whose one end abuts a part of the operating rod and the other end abuts the elastomer fixing unit; an electric booster comprising a motor piston configured to compress at least a part of the reaction disc, for compressing the master cylinder by adjusting a displacement of the motor piston; and an electric controller configured to control the electric booster and perform control to brake the vehicle by using one or more of the regenerative braking and the hydraulic braking.

If the electric controller brakes the vehicle by performing at least the regenerative braking, between the regenerative braking and the hydraulic braking, the electric controller may drive the electric booster so as to compress the reaction disc when disabling the regenerative braking.

The operating rod may be configured to compress a central part of the reaction disc, and the motor piston may be configured to compress an outer perimeter of the reaction disc.

If the motor piston compresses the reaction disc, the central part of the reaction disc may protrude toward the operating rod depending on a degree of compression, thereby forming a protruding portion.

When the protruding portion abuts the operating rod as the brake pedal is pressed, pressure applied from the reaction disc to the operating rod may increase with increasing pressure applied on the reaction disc by the motor piston, and at the same time, an area of contact between the reaction disc and the operating rod may decrease.

When hydraulic pressure in the master cylinder is maintained, if the motor piston moves further toward the reaction disc than the operating rod and the displacement of the motor piston and the displacement of the operating rod are equal, an amount of a pedal force may be maintained regardless of how much the master cylinder is compressed by the reaction disc.

The elastomer may include at least a spring, between the spring and a damper.

According to one aspect of this application, a method of controlling a braking system configured to, when braking a vehicle, one or more of perform cooperative braking and a combination of regenerative braking and hydraulic braking, includes: (a) when a pedal is applied, calculating a total braking force required to brake the vehicle based on a stroke of the pedal measured by a pedal travel sensor; (b) calculating a required regenerative braking force based on the total braking force required; (c) driving a regenerative braking unit to provide a braking force according to the required regenerative braking force; (d) determining whether to stop the regenerative braking or not; (e) if it is determined that the regenerative braking needs to be stopped, calculating a required hydraulic braking force corresponding to stoppage of the regenerative braking; (f) calculating a required displacement of a motor piston corresponding to the required hydraulic braking force; and (g) driving an electric booster so as to compress a reaction disc by moving the motor piston according to the required displacement.

The motor piston may be made of an elastic material.

The motor piston may be configured to compress an outer perimeter of the reaction disc.

In the step (g), when the motor piston may compress the reaction disc, an amount of a formed reaction force is constant.

In the step (f), the required displacement may be calculated based on whether the reaction disc abuts the operating rod whose displacement is adjusted based on an amount of a force applied on a brake pedal.

As explained above, according to this embodiment, the braking system of a vehicle capable of regenerative braking and hydraulic braking and the method of controlling the same by using an elastomer whose one end is fixed and that provides a pedal feel to the driver and a reaction disc of an elastic material, so as to prevent the driver from having an unnatural pedaling feel when a regenerative braking force decreases but a hydraulic braking force increases while the total braking force remains constant.

An object of the present disclosure is to provide a brake system having an improved sensitivity quality in regenerative braking, and a method of controlling the brake system.

Further, an object of the present disclosure is to provide a brake system that can be equipped with an ESC having normal specifications and is not limited to the maximum boosting ratio of an electric booster unit, and a method of controlling the brake system.

According to a second embodiment of the present disclosure, there is an effect that since when regenerative braking is performed, pedal force is adjusted using a pedal spring and a damper, there is an effect that disconnection of pedal decreases and sensitivity quality increases.

Further, when regenerative braking is performed, hydraulic pressure is adjusted by an electric booster unit to corresponding to a braking compensation amount by regenerative braking. Accordingly, there is an effect since common ECSs can be applied to a vehicle without a specific ESC, the manufacturing cost of a vehicle decreases.

DETAILED DESCRIPTION

Figure 1:
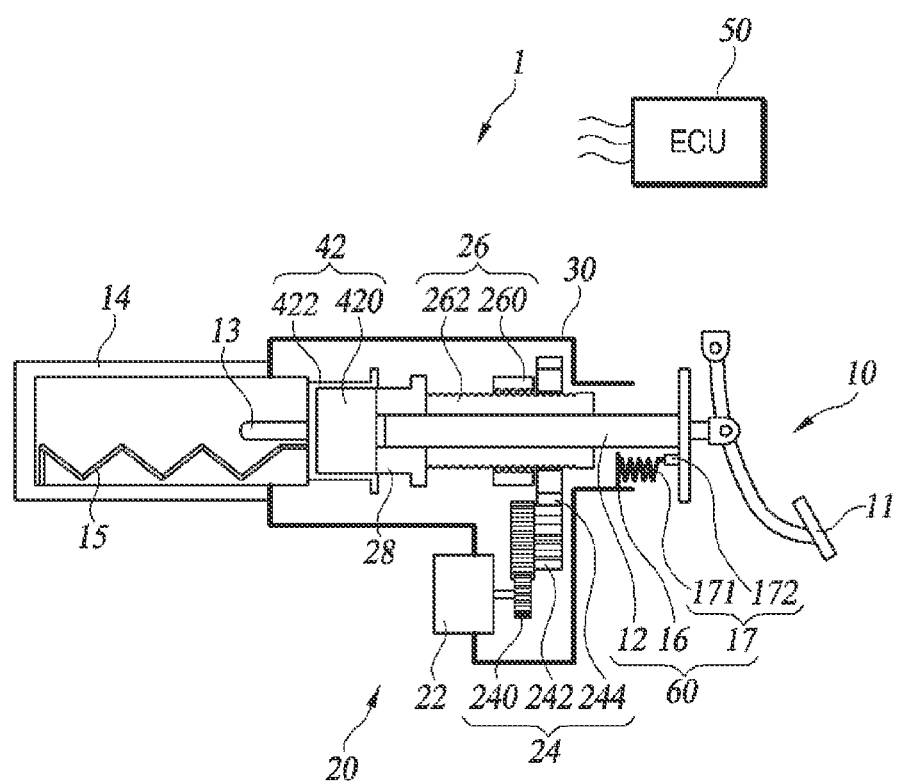
FIG. 1 is a cross-sectional view of a braking system according to an embodiment of the present disclosure.

FIG. 1 is a cross-sectional view of a braking system according to an embodiment of the present disclosure.

Referring to FIG. 1, the rod assembly 60 includes an operating rod 12, an elastomer 17, and an elastomer fixing portion 16.

The operating rod 12 is a medium by which the driver's pedal effort is transmitted to the reaction disc 420. One end of the operating rod 12 is connected to the pedal 11. The operating rod 12 may compress the master cylinder 14 by pushing the reaction disc 420, together with the motor piston 28, toward the master cylinder 14. In an initial state in which the pedal 11 starts to be applied, the other end of the operating rod 12 may be separated from the reaction disc 420. As the pedal 11 is applied, the other end of the operating rod 12 moves forward toward the reaction disc 420.

The elastomer 17 is disposed in such a way that one end abuts the operating rod 12 and the other end abuts the elastomer fixing portion 16. The elastomer 17 generates an elastic force as the operating rod 12 moves. Specifically, when the driver applies the pedal 11, the operating rod 12 moves toward the reaction disc 420 and compresses the elastomer 17. The compressed elastomer 17 generates a reaction force called an elastic force and provides a pedal feel to the driver. Since the other end of the elastomer 17 is disposed to abut the elastomer fixing portion 16, the elastomer 17 is affected solely by a displacement of the operating rod 12. Even if no reaction force is generated from the reaction disc 420 because the operating rod 12 does not abut the reaction disc 420, the driver may have a pedal feel from the reaction force of the elastomer 17. Also, since the elastomer 17 is connected to the elastomer fixing portion 16, not somewhere else like the motor piston 28, the driver will not have an unnatural pedaling feel caused by a pressure change in the master cylinder 14, even at the moment of this pressure change.

The elastomer 17 may be comprised of a spring or a combination of a spring 171 and a damper 172. In this disclosure, the spring 171 and the damper 172 are illustrated as being connected in series but not necessarily limited to this, and the spring 171 and the damper 172 may be connected in parallel.

The elastomer fixing portion 16 is fixed to the housing 30, and at least part of the elastomer 17 is attached to one side of the elastomer fixing portion 16. The elastomer fixing portion 16 is formed to support the elastomer 17 when the elastomer 17 is compressed by the driver's pedal effort.

When the electric control unit 59 performs hydraulic braking, the disc unit 42 provides hydraulic pressure to a plurality of wheel brakes (not shown) by compressing the master cylinder 14. The disc unit 42 includes a reaction disc 420 and a reaction disc container 422.

The reaction disc 420 is configured to be compressed by one or more of the operating rod 12 and the motor piston 28. FIG. 1 of the present disclosure illustrates that the reaction disc 420 and the motor piston 28 are in contact with each other. However, if no braking request signal is generated by the electric control unit 50, this may mean that the motor piston 28 is separated from the reaction disc 420.

The reaction disc 420 may be configured in such a way that an outer circumference of the reaction disc 420, i.e., its outer perimeter, is compressed by the motor piston 28, and the central part of the reaction disc 420 is compressed by the operating rod 12. To this end, a longitudinal section of the motor piston 28 may be approximately annular, and the operating rod 12 may penetrate through a hollow portion formed at the center of the motor piston 28. In this case, the operating rod 12 and the reaction disc 420 are coaxially arranged. However, the present disclosure is not limited to this, and any braking system with a device capable of compressing the reaction disc 420 by applying the pedal 11 and driving the motor 22 may be included in this disclosure.

The reaction disc 420 is made of a compressible elastic material. For example, at least part of the reaction disc 420 may be made of a rubber material. When the reaction disc 420 is compressed by one or more of the operating rod 12 and the motor piston 28, a reaction force created by the compressing force is transmitted to the driver through the operating rod 12, and constitutes part of the driver's pedal feel.

The reaction disc container 422 is formed in such a way as to contain at least part of the reaction disc 420 in a space formed therewithin. When one side of the reaction disc container 422 is compressed by one or more of the operating rod 12 and the motor piston 28, the other side of the reaction disc container 422 compresses the push rod 13.

A total pedal force provided to the driver may be determined as the sum of the pedal force generated by the reaction force to the compressing force of the reaction disc 420 and the pedal force generated by the reaction force to the compressing force of the elastomer 17.

The electric control unit 50 generates a braking request signal based on a pedaling signal transmitted from a pedal travel sensor (not shown). The braking request signal is an electrical signal that allows at least part of a plurality of wheel brakes (not shown) to generate a braking force.

The electric control unit 50 calculates the total braking force required to brake the vehicle based on the pedaling signal. Also, the electric control unit 50 determines whether to use either regenerative braking or hydraulic braking or both, and applies a regenerative braking force and controls the electric booster unit 20 differently, depending on whether regenerative braking and/or hydraulic braking is used or not. Here, the total braking force required may be the sum of hydraulic braking force and regenerative braking force. A plurality of braking modes may be set. For example, the electric control unit 50 may brake the vehicle by setting a hydraulic braking mode which uses a hydraulic braking force alone, a regenerative braking mode which uses a regenerative braking force alone, and a cooperative braking mode which uses both a hydraulic braking force and a regenerative braking force.

FIG. 2 is a schematic diagram for explaining a relationship among a reaction disc of an elastic material, an operating rod, a motor piston, and a pedal force.

Figure 2A:
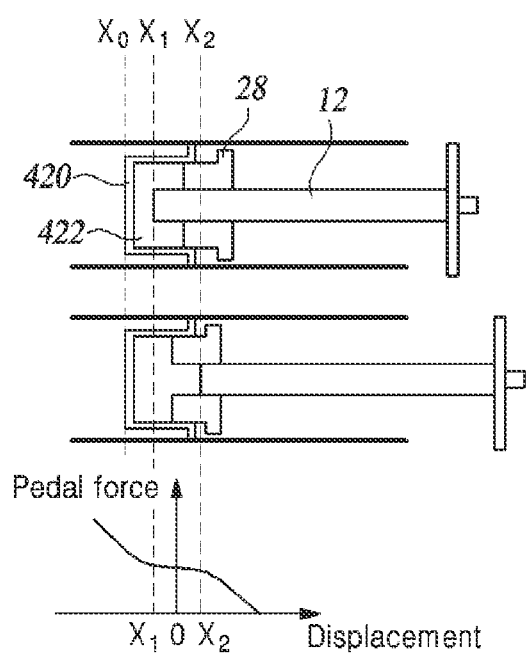
FIGS. 2A and 2B are schematic diagrams for explaining a relationship among a reaction disc of elastic material, an operating rod, a motor piston, and a pedal force.
Figure 2B:
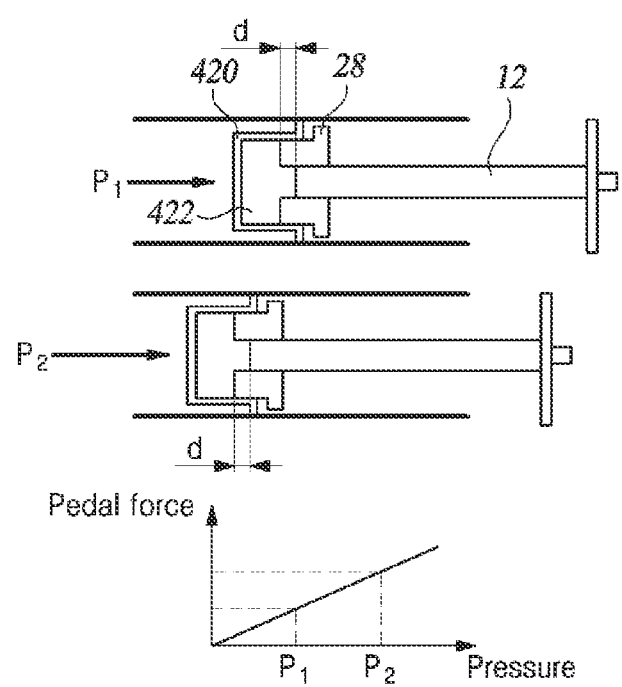

FIG. 2A depicts a schematic diagram for explaining the pedal force relative to the displacement of the operating rod 12 when the displacement of the reaction disc 420 does not vary. FIG. 2B depicts a schematic diagram for explaining the pedal force relative to the amount of force applied into the master cylinder 14 when the relative displacement of the motor piston 28 and the operating rod 12 is constant.

Referring to FIG. 2A, it can be seen that the pedal force increases when the operating rod 12 moves toward the reaction disc 420 and the pedal force decreases when the operating rod 12 moves in the opposite direction. However, there is little change in the driver's pedal feel if the difference between the displacement of the operating rod 12 and the displacement of the reaction disc 420 is within a given range. This is attributed to an elastic material characteristic of the reaction disc 420.

Referring to FIG. 2B, if the difference between the displacement of the operating rod 12 and the displacement of the reaction disc 420 is constant and the hydraulic pressure in the master cylinder 14 is increased by compressing the reaction disc 420, the driver's pedal feel increases with the hydraulic pressure in the master cylinder 14, not with the displacement of the motor piston 28 and the displacement of the operating rod 12.

Figure 3:
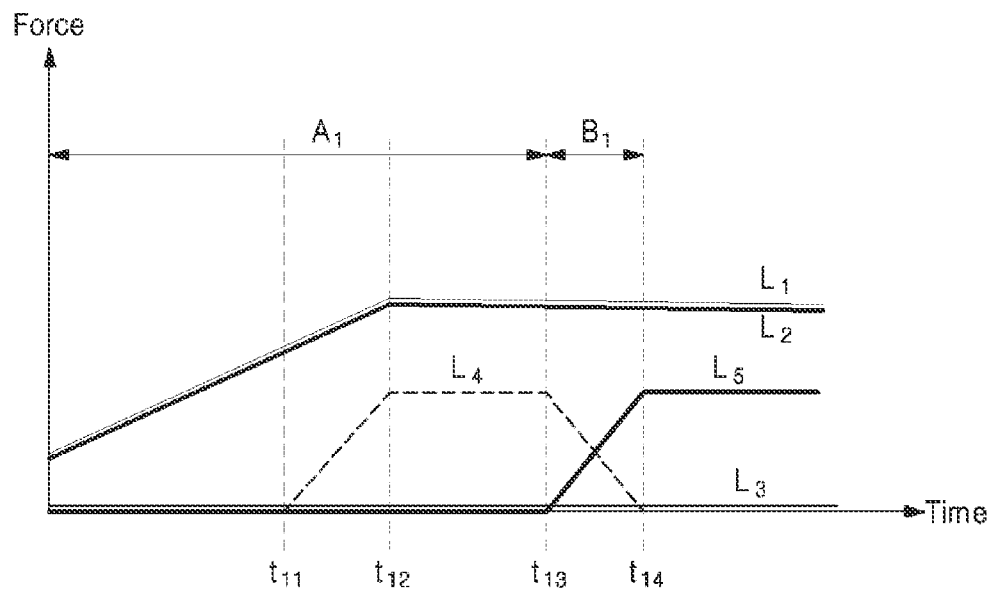
FIG. 3 is a graph for explaining a relationship among the total pedal force, an elastomer's pedal force, a reaction disc's pedal force, a regenerative braking force, and a hydraulic braking force vs. time, if regenerative braking is disabled during braking, when the electric control unit performs regenerative braking alone.

FIG. 3 is a graph for explaining a relationship among the total pedal force, an elastomer's pedal force, a reaction disc's pedal force, a regenerative braking force, and a hydraulic braking force vs. time, when regenerative braking is disabled during braking, while the electric control unit performs regenerative braking alone. FIG. 4 is a schematic diagram for explaining how the operation works at the starting point, time $t_{13}$, and time $t_{14}$ of FIG. 3.

Hereinafter, in the graphs depicted in FIGS. 3, 5, 7, and 9, $L_1$ represents the total pedal force, $L_2$ represents the pedal force of the elastomer 17, $L_3$ represents the pedal force of the reaction disc 420, $L_4$ represents the regenerative braking force, and $L_5$ represents the hydraulic braking force.

Figure 4A:
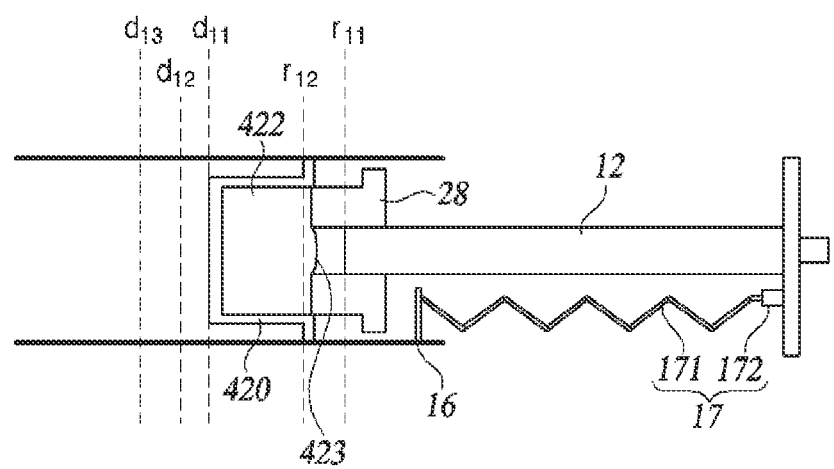
FIGS. 4A-4C are schematic diagrams for explaining how the operation works at the starting point, time $t_{13}$ and time $t_{14}$ of FIG. 3.
Figure 4B:
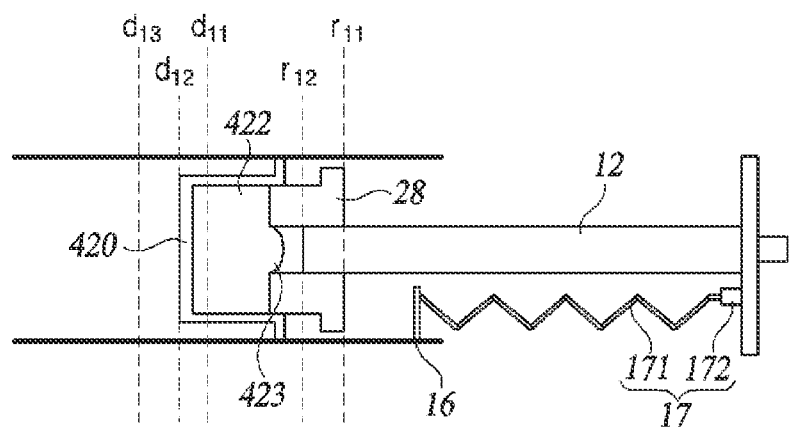
Figure 4C:
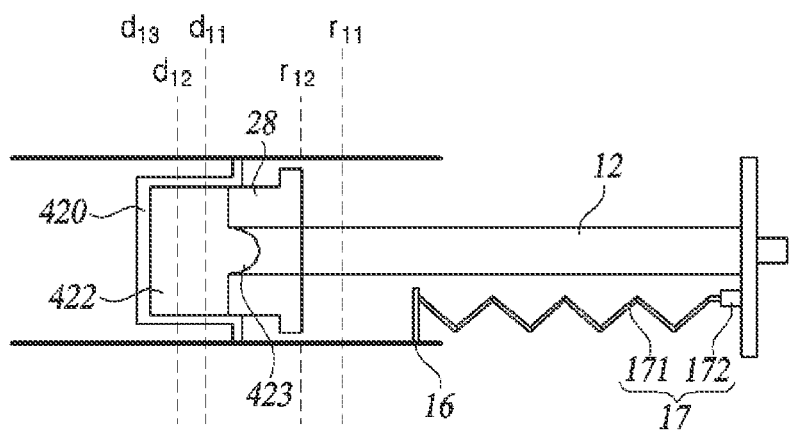

FIG. 4A depicts the operation at the starting point of FIG. 3, FIG. 4B depicts the operation at time $t_{13}$ of FIG. 3, and FIG. 4C depicts the operation at time $t_{14}$ of FIG. 3.

The starting point of FIG. 3 is a point in time $r_{11}$ where the driver starts to apply the pedal 11, at which the total pedal force $L_1$ is generated. Since the operating rod 12 is separated from a central part 423 of the reaction disc 420, the pedal force $L_3$ caused by the reaction force of the reaction disc 420 is not generated.

No braking force is generated in the period between the starting point and the time $t_{11}$ which is an initial duration in which the driver applies the pedal 11. In this period, the pedal force $L_2$ generated by the compression of the elastomer 17 increases gradually.

The period between time $t_{11}$ and time $t_{12}$ is a period in which the corresponding braking force is generated as the amount of effort on the pedal 11 by the driver increases. FIG. 3 illustrates that the electric control part 50 initiates the regenerative braking mode to brake the vehicle in this period, during which the hydraulic braking force $L_5$ is not generated but the regenerative braking force $L_4$ increases gradually.

The period between time $t_{12}$ and time $t_{13}$ is a period in which the amount of effort on the pedal 11 by the driver is maintained. In this period, the amount of braking force required by the driver does not vary, and therefore the regenerative braking force $L_4$ also remains constant. As shown in FIG. 4B, the motor piston 28 compresses the reaction disc 420 at time $t_{13}$, which causes the displacement of the disc unit 42 to move from $d_{11}$ to $d_{12}$ as shown in FIG. 4, but to such an extent that the hydraulic braking force $L_5$ is not generated. The central part 423 of the reaction disc 420 protrudes further than in FIG. 4A due to the pressure applied from the motor piston 28, but it still does not abut the operating rod 12.

The period between time $t_{13}$ and time $t_{14}$ is a period in which the electric control unit 50 disables the regenerative braking mode and initiates the hydraulic braking mode. In this period, the regenerative braking force $L_4$ is decreased, and the hydraulic braking force $L_5$ is increased by an amount equal to the decrease in braking force. The period between time $t_{13}$ and time $t_{14}$ is a period in which the hydraulic braking force $L_5$ is increased. In the braking system according to an embodiment of the present disclosure, the electric booster unit 20 is driven in order to generate hydraulic braking force in the period between time $t_{13}$ and time $t_{14}$, which moves the motor piston 28 from $d_{12}$ to $d_{13}$ and compresses the master cylinder 14. As shown in FIG. 4C, at time $t_{14}$, the displacement of the operating rod 12 does not change from $r_{12}$ but only the displacement of the motor piston 28 changes. Since the operating rod 12 still does not abut the reaction disc 420, the total pedal force $L_1$ is affected solely by the pedal force $L_2$ of the elastomer 17. Accordingly, the driver has no unnatural feel during the period in which the hydraulic braking force increases. Over the entire period, the total pedal force $L_1$ is equal to the pedal force $L_2$ of the elastomer 17 since the operating rod 12 does not abut the central part 423 of the reaction disc 420.

Figure 5:
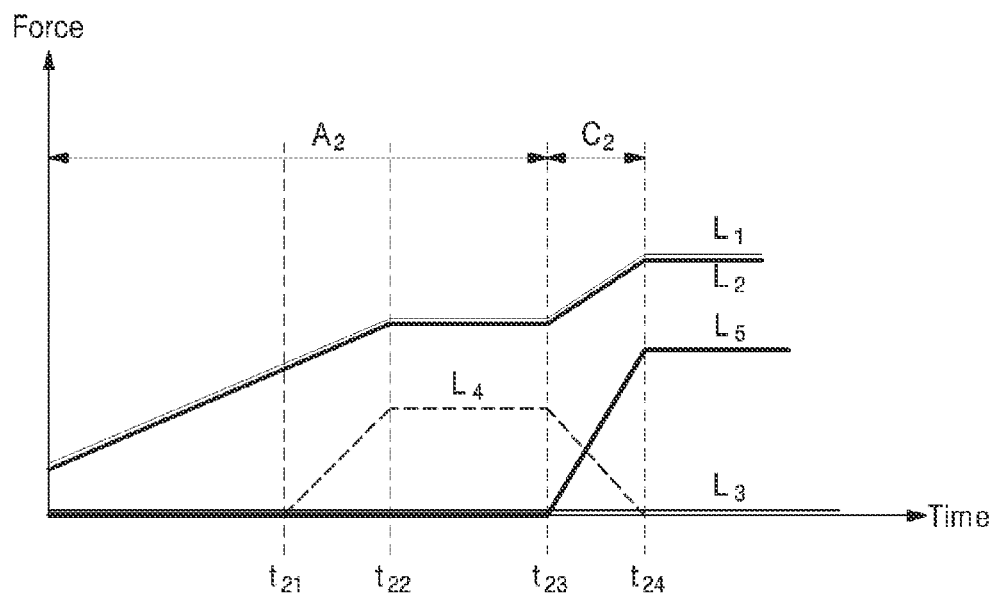
FIG. 5 is a graph for explaining a relationship among the total pedal force, an elastomer's pedal force, a reaction disc's pedal force, a regenerative braking force, and a hydraulic braking force vs. time, if the amount of pedal effort increases while the regenerative braking is disabled during braking, when the electric control unit performs regenerative braking alone.

FIG. 5 is a graph for explaining a relationship among the total pedal force, an elastomer's pedal force, a reaction disc's pedal force, a regenerative braking force, and a hydraulic braking force vs. time, if the amount of pedal effort increases while the regenerative braking is disabled during braking, when the electric control unit performs regenerative braking alone. FIG. 6 is a schematic diagram for explaining how the operation works at the starting point, time $t_{23}$ and time $t_{24}$ of FIG. 5.

Figure 6A:
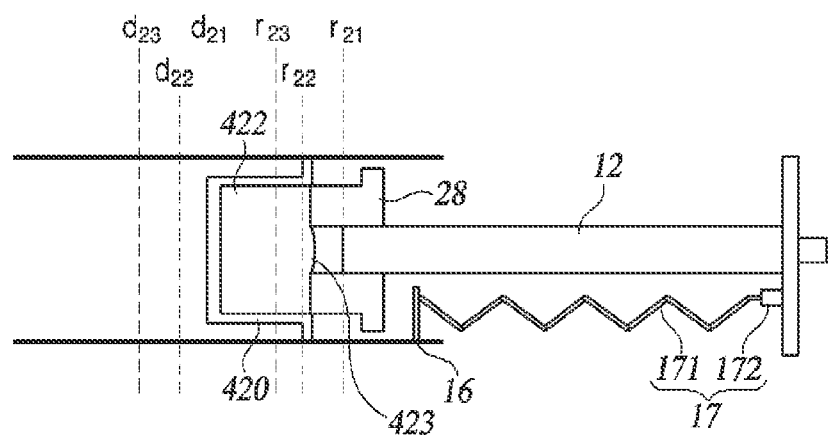
FIGS. 6A-6C are schematic diagrams for explaining how the operation works at the starting point, time $t_{23}$ and time $t_{24}$ of FIG. 5.
Figure 6B:
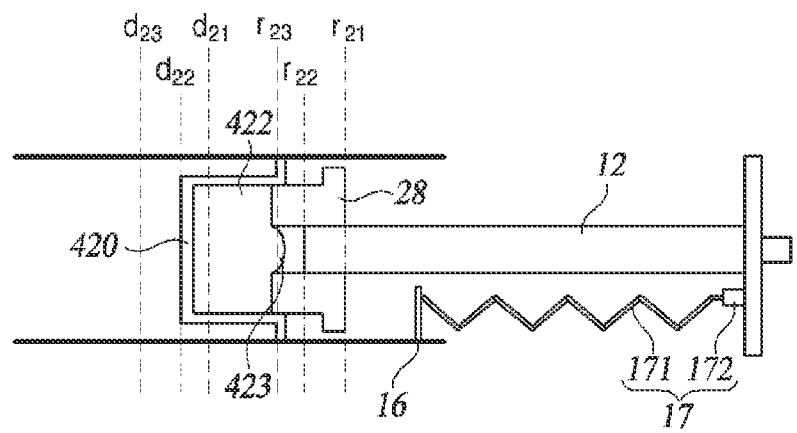
Figure 6C:
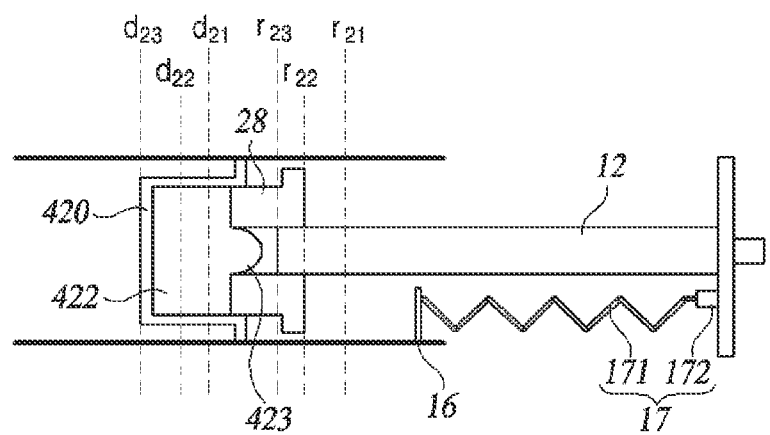

FIG. 6A depicts how the operation at the starting point of FIG. 5, FIG. 6B depicts the operation at time $t_{23}$ of FIG. 5, and FIG. 6C depicts the operation at time $t_{24}$ of FIG. 5. Here, the operation of the braking system in the period between the starting point and the time $t_{23}$ in the graph depicted in FIG. 5 is similar to the operation in the period between the starting point and the time $t_{13}$, so a description thereof will be omitted.

At time $t_{23}$, the electric control unit 50 disables the regenerative braking mode and starts to set the hydraulic braking mode. In the period between time $t_{23}$ and time $t_{24}$, the regenerative braking force $L_4$ decreases and the hydraulic braking force $L_5$ increases. As shown in FIG. 5, the driver increases the amount of pedal effort in this period, and therefore the required hydraulic braking force $L_5$ is greater than the maximum amount of existing braking force $L_4$.

The amount of increase in hydraulic braking force $L_5$ in the period between time $t_{23}$ and time $t_{24}$ shown in FIG. 5 is greater than in the period between time $t_{13}$ and time $t_{14}$ shown in FIG. 3.

Even so, the braking system according to an embodiment of the present disclosure prevents the driver from having an unnatural pedaling feel.

As depicted in FIG. 6B and FIG. 6C, the displacement of the operating rod 12 moves from $r_{22}$ to $r_{23}$ as the driver increases the amount of pedal effort. Also, the motor piston 28 compresses the disc unit 42 as the electric booster unit 20 is driven, which causes the displacement of the disc unit 42 to move from $d_{22}$ to $d_{23}$ and compresses the master cylinder 14, thereby creating hydraulic pressure. As in FIG. 6C, since the operating rod 12 and the central part 423 of the reaction disc 420 do not abut each other, the driver is affected solely by the pedal force of the elastomer 17. Accordingly, the driver has no unnatural pedaling feel despite a change in hydraulic pressure in the master cylinder 14.

Figure 7:
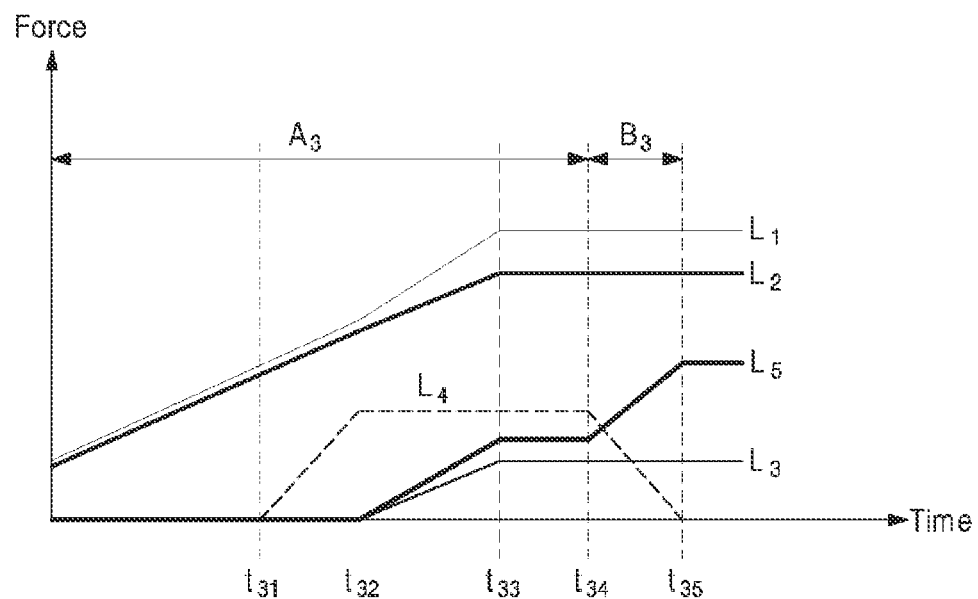
FIG. 7 is a graph for explaining a relationship among the total pedal force, an elastomer's pedal force, a reaction disc's pedal force, a regenerative braking force, and a hydraulic braking force vs. time, if regenerative braking is disabled during braking, when the electric control unit performs regenerative braking and hydraulic braking.

FIG. 7 is a graph for explaining a relationship among the total pedal force, an elastomer's pedal force, a reaction disc's pedal force, a regenerative braking force, and a hydraulic braking force vs. time, if regenerative braking is disabled during braking, when the electric control unit performs regenerative braking and hydraulic braking. FIG. 8 is a schematic diagram for explaining how the operation works at the starting point, time $t_{34}$ and time $t_{35}$ of FIG. 7.

Figure 8A:
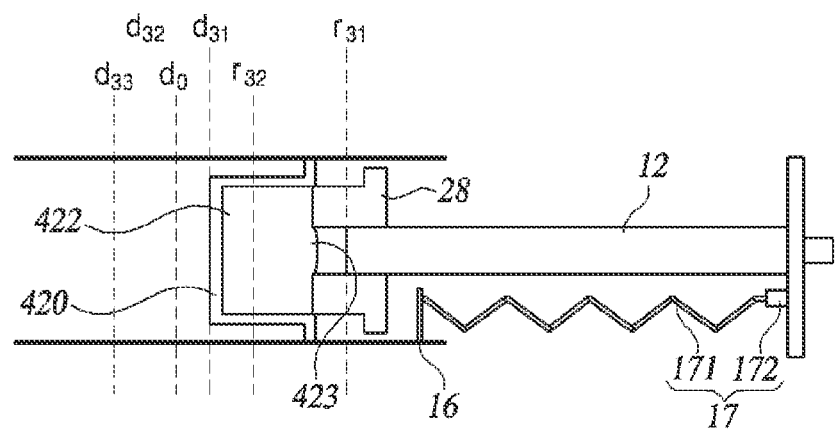
FIGS. 8A-8C are schematic diagrams for explaining how the operation works at the starting point, time $t_{34}$ and time $t_{35}$ of FIG. 7.
Figure 8B:
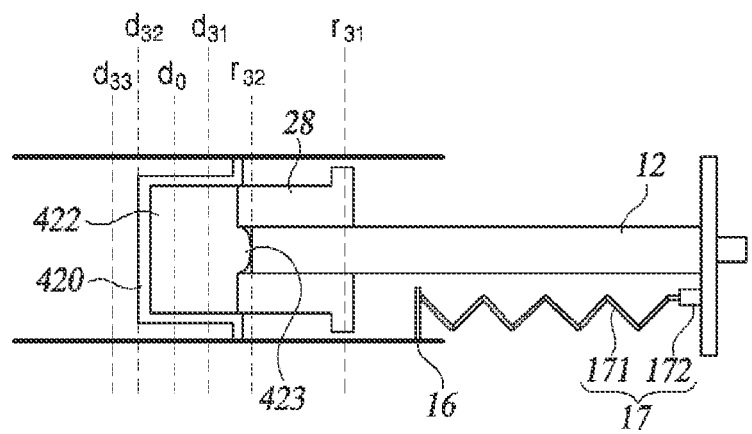

FIG. 8A depicts the operation at the starting point of FIG. 7, FIG. 8B depicts the operation at time $t_{34}$ of FIG. 8, and FIG. 4C depicts the operation at time $t_{35}$ of FIG. 7.

The starting point of FIG. 7 is a point in time where the driver starts to apply the pedal 11, at which the operating rod 12 is positioned at $r_{31}$ and the total pedal force $L_1$ is generated. Since the operating rod 12 is separated from a central part 423 of the reaction disc 420, the pedal force $L_3$ caused by the reaction force of the reaction disc 420 is not generated.

No braking force is generated in the period between the starting point and the time $t_{31}$ which is an initial duration in which the driver applies the pedal 11. In this period, the pedal force $L_3$ generated by the compression of the elastomer 17 increases gradually.

The period between time $t_{31}$ and time $t_{32}$ is a period in which the corresponding braking force is generated as the amount of effort on the pedal 11 by the driver increases. FIG. 7 illustrates that the electric control part 50 initiates the regenerative braking mode first to brake the vehicle in this period, during which the hydraulic braking force $L_5$ is not generated but the regenerative braking force $L_4$ increases gradually.

The period between time $t_{32}$ and time $t_{33}$ is a period in which the hydraulic braking force $L_5$ is generated since it is determined that the electric control unit 50 should initiate the hydraulic braking mode, including more effort on the pedal 11 from the driver. In this period, the regenerative braking force $L_4$ is maintained but the electric booster unit 20 is driven to compress the motor piston 28 and increase the hydraulic pressure supplied to a plurality of wheel brakes (not shown). In this process, the operating rod 12 moves further toward the master cylinder 14 and compresses the protruding central part 423 of the reaction disc 420. As the operating rod 12 abuts the central part 423 of the reaction disc 420, the driver feels additional pedal force $L_3$. Here, the total pedal force $L_1$ is the sum of the pedal force $L_2$ of the elastomer 17 and the pedal force $L_3$ of the reaction disc 420.

The period between time $t_{33}$ and time $t_{34}$ is a period in which the amount of effort on the pedal 11 by the driver is maintained. In this period, the amount of braking force required by the driver does not vary, and therefore the regenerative braking force $L_4$ and the hydraulic braking force $L_5$ also remain constant. As shown in FIG. 8B, the motor piston 28 compresses the reaction disc 420 at time $t_{34}$, which causes the displacement of the disc unit 42 to move to $d_{32}$ as shown in FIG. 8 and passes through the point $d_0$ where the hydraulic braking force $L_5$ starts to be generated. The central part 423 of the reaction disc 420 protrudes further than in FIG. 8A due to the pressure applied from the motor piston 28, and abuts the operating rod 12. In this period, the driver increases the amount of pedal effort in order to generate the hydraulic braking force $L_5$, and therefore the displacement of the operating rod 12 also moves to $r_{32}$.

The period between time $t_{34}$ and time $t_{35}$ is a period in which the electric control unit 50 disables the regenerative braking mode and increases the hydraulic braking force by an amount equal to the decrease in regenerative braking force. The period between time $t_{34}$ and time $t_{35}$ is a period in which the hydraulic braking force $L_5$ is increased. As the brake oil in the master cylinder 14 flows to a plurality of wheel brakes (not shown), the hydraulic pressure in the master cylinder 14 decreases.

Figure 8C:
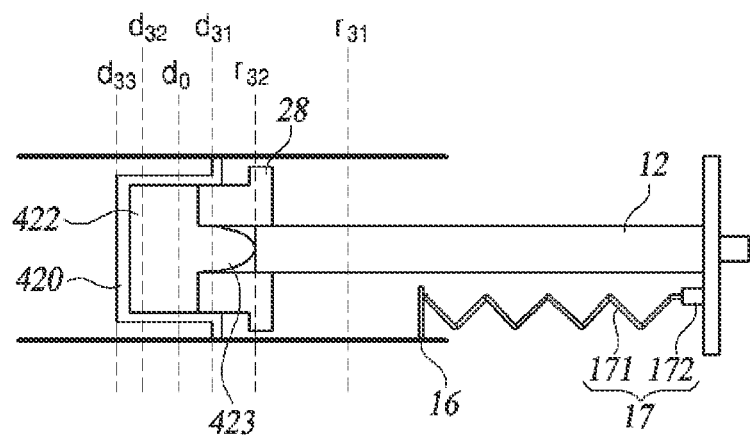

In the braking system according to an embodiment of the present disclosure, the electric booster unit 20 is driven in order to increase the hydraulic braking force in the period between time $t_{34}$ and time $t_{35}$, which moves the motor piston 28 from $d_{32}$ to $d_{33}$ and further compresses the master cylinder 14. As shown in FIG. 8C, at time $t_{35}$, the displacement of the operating rod 12 does not change from $r_{12}$ but only the displacement of the motor piston 28 changes. Since the operating rod 12 continues to abut the reaction disc 420, the total pedal force $L_1$ is affected by the pedal force $L_2$ of the elastomer 17 and the pedal force $L_3$ of the reaction disc 420. However, the total pedal force $L_1$ does not change even if affected by the pedal force $L_3$ of the reaction disc 420. This will be described below in detail.

When the pedal force felt by the driver in FIG. 8B is denoted by $F_1$ and the pedal force felt by the driver in FIG. 8C is denoted by $F_2$, $F_1$ and $F_2$ satisfy Equation 1:

$$F_1 = P_{rd1}A_1 + KX_1 \quad \text{[Equation 1]}$$
$$F_2 = P_{rd2}A_2 + KX_2$$

where $P_{rd1}$ refers to the pressure applied from the reaction disc 420 to the operating rod 12 in FIG. 8B, $A_1$ refers to the area of contact between the reaction disc 420 and the operating rod 12 in FIG. 8B, K refers to the elastic coefficient of the elastomer 17, $X_1$ refers to the distance the elastomer 17 is compressed in FIG. 8B, $P_{rd2}$ refers to the pressure applied from the reaction disc 420 to the operating rod 12 in FIG. 8C, $A_2$ refers to the area of contact between the reaction disc 420 and the operating rod 12 in FIG. 8C, and $X_2$ refers to the distance the elastomer 17 is compressed in FIG. 8C.

In the period between FIG. 8B and FIG. 8C, the displacement of the operating rod 12 remains at the point $r_{32}$, thus $X_1 = X_2$. Therefore, $KX_1 = KX_2$.

In FIG. 8C, the hydraulic braking force needs to be increased by an amount equal to the decrease in the regenerative braking force, and therefore the motor piston 28 is moved further forward toward the master cylinder 14. The motor piston 28 compresses the reaction disc 420 even further while the displacement of the operating rod 12 is maintained. Thus, the central part 423 of the reaction disc 420 made of an elastic material protrudes further, and the reaction disc 420 has a higher pressure ($P_{rd1} < P_{rd2}$).

However, even if there is a variation in the pressure applied from the reaction disc 420 to the operating rod 12, the central part 423 of the reaction disc 420 in FIG. 8C protrudes even further, thus making the area of contact with the operating rod 12 smaller. Therefore, $A_1 > A_2$.

Although $P_{rd1} < P_{rd2}$, $\approx P_{rd1}A_1 \approx P_{rd2}A_2$ because $A_1 > A_2$. In this disclosure, the reaction disc 420 is made of an elastic material, and the amount of protrusion and the area of contact with the operating rod 12 may vary with changes in the elasticity of the reaction disc 420. The reaction disc 420 may be designed so that $P_{rd1}A_1 = P_{rd2}A_2$, thereby eliminating any difference between the pedal forces $F_1$ and $F_2$ the driver feels while the regenerative braking force decreases and the hydraulic braking force increases.

Figure 9:
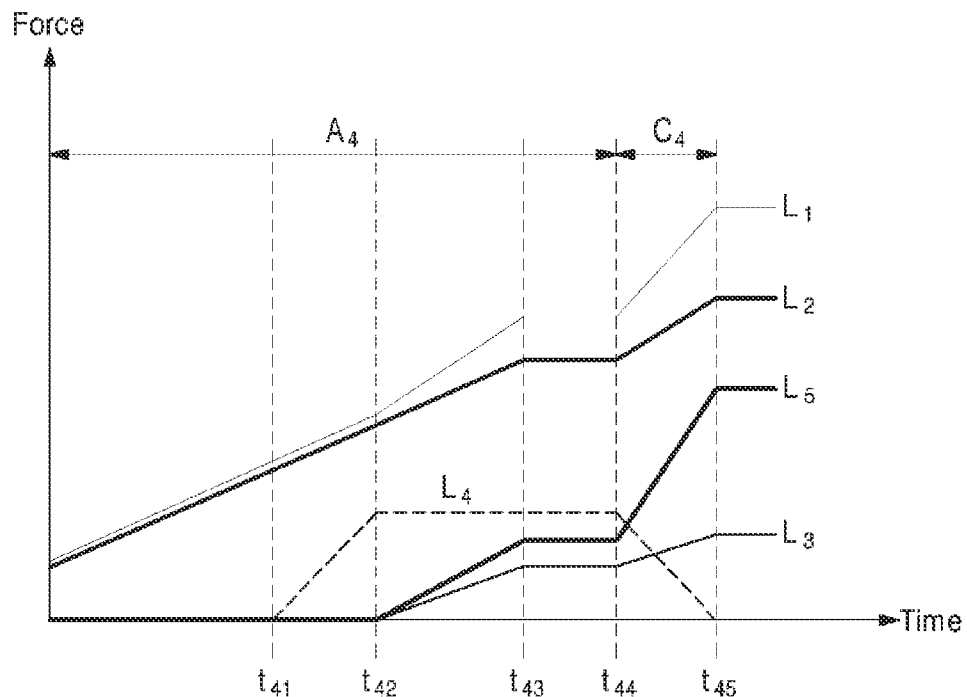
FIG. 9 is a graph for explaining a relationship among the total pedal force, an elastomer's pedal force, a reaction disc's pedal force, a regenerative braking force, and a hydraulic braking force vs. time, if the amount of pedal effort increases while the regenerative braking is disabled during braking, when the electric control unit performs regenerative braking and hydraulic braking.

FIG. 9 is a graph for explaining a relationship among the total pedal force, an elastomer's pedal force, a reaction disc's pedal force, a regenerative braking force, and a hydraulic braking force vs. time, if the amount of pedal effort increases while the regenerative braking is disabled during braking, when the electric control unit performs regenerative braking and hydraulic braking. FIG. 10 is a schematic diagram for explaining how the operation works at the starting point, time $t_{44}$, and time $t_{45}$ of FIG. 9.

Figure 10A:
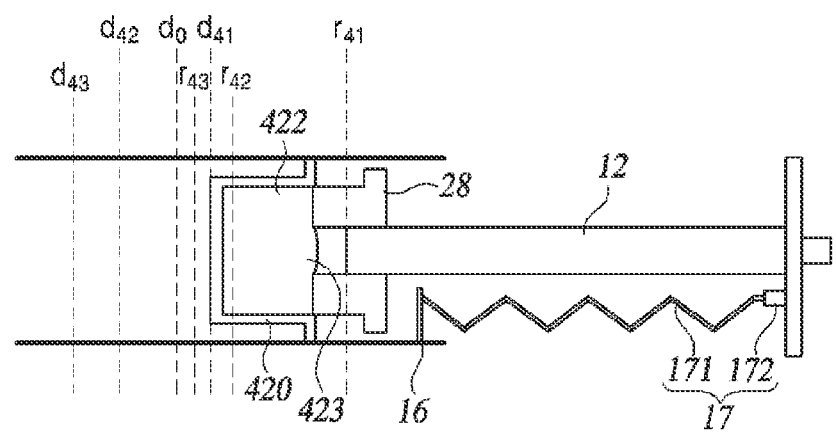
FIGS. 10A-10C are schematic diagrams for explaining how the operation works at the starting point, time $t_{44}$, and time $t_{45}$ of FIG. 9.
Figure 10B:
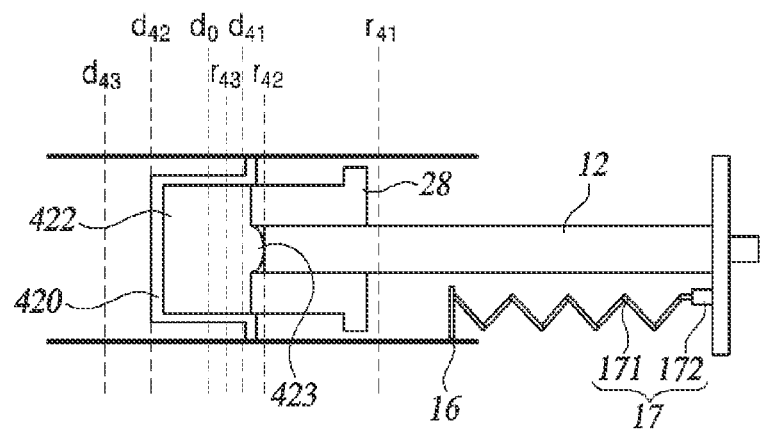
Figure 10C:
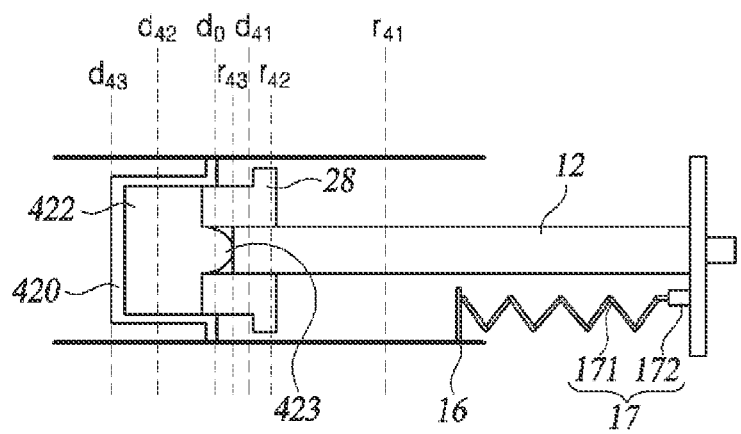

FIG. 10A depicts how the operation at the starting point of FIG. 9, FIG. 10B depicts the operation at time $t_{44}$ of FIG. 9, and FIG. 10C depicts the operation at time $t_{45}$ of FIG. 9. Here, the operation of the braking system in the period between the starting point and the time $t_{44}$ in the graph depicted in FIG. 9 is similar to the operation in the period between the starting point and the time $t_{34}$, so a description thereof will be omitted.

At time $t_{44}$, the electric control unit 50 disables the regenerative braking mode and drives the electric booster unit 20 in order to increase the hydraulic braking force $L_5$. In the period between time $t_{44}$ and time $t_{45}$, the regenerative braking force $L_4$ decreases and the hydraulic braking force $L_5$ increases. As shown in FIG. 9, the driver increases the amount of pedal effort in this period, and therefore the required hydraulic braking force $L_5$ is greater than the maximum amount of existing braking force $L_4$.

The amount of increase in hydraulic braking force $L_5$ between time $t_{44}$ and time $t_{45}$ shown in FIG. 9 is greater than in the period between time $t_{34}$ and time $t_{35}$ shown in FIG. 7.

Even so, the braking system according to an embodiment of the present disclosure prevents the driver from having an unnatural pedaling feel.

As depicted in FIG. 10B and FIG. 10C, the displacement of the operating rod 12 moves from $r_{42}$ to $r_{43}$ as the driver increases the amount of pedal effort. Also, the motor piston 28 compresses the disc unit 42 as the electric booster unit 20 is driven, which causes the displacement of the disc unit 42 to move from $r_{42}$ to $r_{43}$ and compresses the master cylinder 14, thereby increasing hydraulic pressure. During the operation in FIG. 10B and FIG. 10C, the operating rod 12 continues to abut the central part 423 of the reaction disc 420, but there is little change in the pedal force felt by the driver as explained with reference to Equation 1. Accordingly, the driver has no unnatural pedaling feel despite a change in hydraulic pressure in the master cylinder 14.

Figure 11:
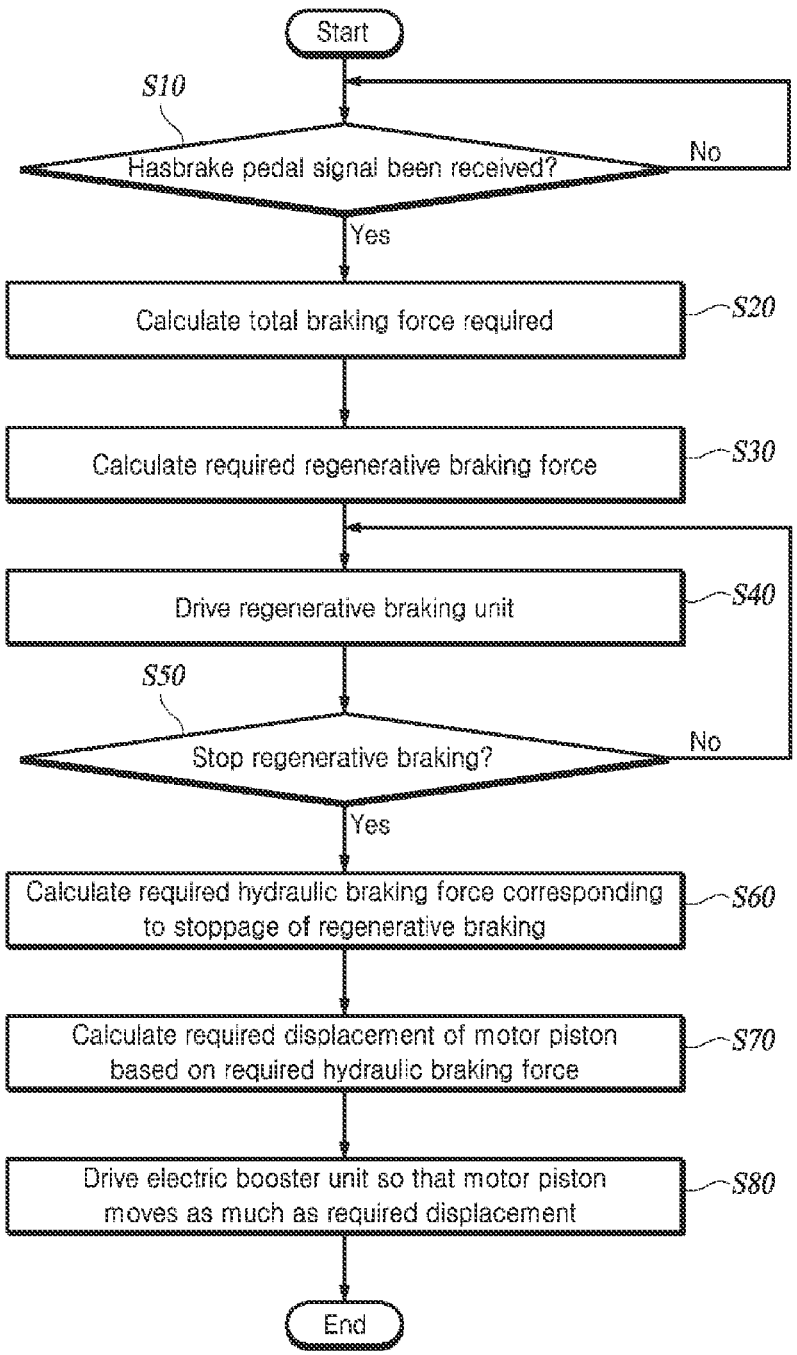
FIG. 11 is a flowchart of a method of controlling a braking system according to an embodiment of the present disclosure.

FIG. 11 is a flowchart of a method of controlling a braking system according to an embodiment of the present disclosure. The flowchart depicted in FIG. 11 is a description of some of numerous braking methods, and the electric control unit 50 does not necessarily include the algorithm of FIG. 11 but may include a plurality of braking algorithms including that one. FIG. 11 is a flowchart drawn under the assumption that only the regenerative braking unit is driven, and, apart from this, the electric control unit 50 may include methods of braking by driving the hydraulic braking unit alone.

The electric control unit 50 receives a brake pedal signal (S10). That is, the electric control unit 50 receives a signal from the brake pedal 11 in order to check whether the driver applies the pedal 11 or not. If the electric control unit 50 receives no brake pedal signal, it is determined that there is no braking situation, and does not proceed to the control process of FIG. 11.

If the electric control unit 50 receives a brake pedal signal, it calculates total braking force required (S20). The total braking force required is set based on the amount of effort on the pedal 11 by the driver, and the electric control unit 50 may additionally determine the total braking force required if equipped with an autonomous driving function. When the driver applies the pedal 11, the electric control unit 50 calculates the total braking force required to brake the vehicle based on the amount of effort on the pedal 11 measured by a pedal travel sensor (not shown).

The electric control unit 50 calculates required regenerative braking force based on the total braking force required (S20). After calculating the required regenerative braking force, the electric control unit 50 drives the regenerative braking unit (not shown) based on the calculated required generative braking force (S40).

While the regenerative braking unit (not shown) is being driven, the electric control unit 50 determines whether to stop regenerative braking or not (S50). The electric control unit 50 may determine itself whether to stop regenerative braking or not, or may determine whether to stop regenerative braking or not by using a regenerative braking interruption signal received from the outside.

If it is determined that the regenerative braking is stopped, the electric control unit calculates required hydraulic braking force corresponding to the stoppage of regenerative braking (S60). Once the electric control unit 50 disables the regenerative braking mode, the regenerative braking force is decreased. The electric control unit 50 senses the amount of decrease in regenerative braking force and calculates the hydraulic braking force required to compensate for the sensed decrease in braking force.

The electric control unit 50 calculates a required displacement of the motor piston 28 corresponding to the required hydraulic braking force (S70). The required displacement of the motor piston 28 is determined based on the displacement of the motor piston 28 at a point in time when the electric control unit 50 stops regenerative braking.

The electric control unit 50 drives the electric booster unit 20 so that the motor piston 28 moves as much as the required displacement (S80). The electric control unit 50 moves the motor piston 29 toward the master cylinder 14 so that the electric booster unit 20 is driven to compress the reaction disc 420. Here, the reaction disc 420 may be made of an elastic material, and the motor piston 28 may abut an outer perimeter of the reaction disc 420. As the motor piston 28 compresses the reaction disc 420, the central part 423 of the reaction disc 420 may protrude toward the operating rod 12. The protruded reaction disc 420 provides reaction force to the operating rod 12 if it abuts the operating rod 12. This reaction force is part of the pedal force felt by the driver. In this disclosure, as explained with reference to the above Equation 1, even if the reaction disc 420 and the operating rod 12 abut each other, the driver has no unnatural pedaling feel in the period in which the regenerative braking force decreases and the hydraulic braking force increases.

After the step S80, the algorithm of this disclosure is finished.

Hereafter, a brake system according to a second embodiment of the present disclosure and a method of controlling the brake system are described.

It should be noted that the conceptual diagrams of a brake system 1b shown in FIGS. 12 to 14 and FIG. 16 in the present disclosure are briefly shown for easy understanding of the operation process of the brake system 1b and may be different from the actual detailed shape of the brake system 1b.

Configuration of Brake System

Figure 12:
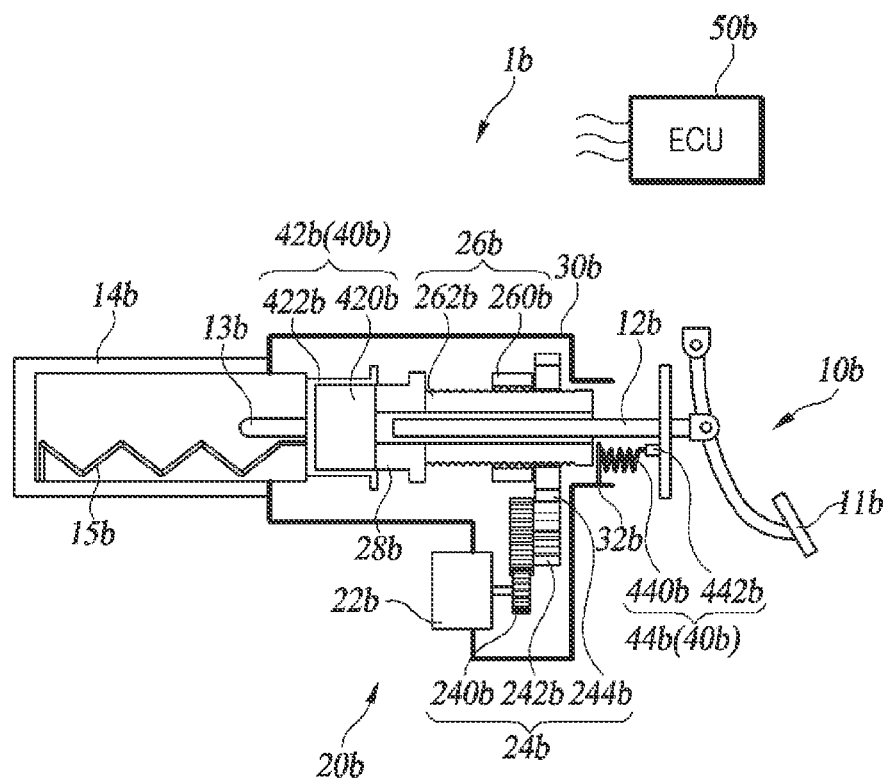
FIG. 12 is a conceptual diagram showing the initial state of a brake system according to a second embodiment of the present disclosure.

FIG. 12 is a conceptual diagram showing the initial state of a brake system according to a second embodiment of the present disclosure.

Referring to FIG. 12, a brake system 1b according to a second embodiment of the present disclosure includes all or some of a pedal master unit 10b, an electric booster unit 20b, a housing 30b, a pedal force generating unit 40b, and an electric control unit 50b.

When a pedal 11b is depressed by a driver, the pedal master unit 10b transmits the depression to the master cylinder 14b. The pedal master unit 10b includes all or some of an operating rod 12b, a push rod 13b, a master cylinder 14b, and a return spring 15b.

The pedal 11b is a part that is depressed by a driver to decelerate or stop a vehicle. When a driver depresses the pedal 11b and a first end of the operating rod 12b is pressed at a predetermined pressure or more, a second end of the operating rod 12b presses a reaction disc 32b. In this case, the stroke of the pedal 11b is sensed by a pedal travel sensor (not shown) that is separately provided.

The operating rod 12b is a medium that transmits pedal effort by a driver to the reaction disc 420b. The first end of the operating rod 12b is connected to the pedal 11b. The pedal force $F_{RD}$ transmitted to the reaction disc 420b is transmitted to the master cylinder 14b through the operating rod 12b. In the initial state in which the pedal 11b starts to be depressed, the second end of the operating rod 12b is spaced apart from the reaction disc 420b. As the pedal 11b is depressed, the second end of the operating rod 12b is moved forward toward the reaction disc 420b.

The push rod 13b is at least partially inserted in the master cylinder 14b. The push rod 13b reciprocates in the longitudinal direction of the master cylinder 14b in the master cylinder 14b, and can press a brake liquid stored in the master cylinder 14b when moving forward.

The master cylinder 14b is configured to keep a brake liquid therein. Hydraulic pressure that is used for braking is generated when the brake liquid in the master cylinder 14b is pressed. The generated hydraulic pressure is transmitted to a plurality of wheel brake assemblies (not shown).

The return spring 15b is disposed in the master cylinder 14b and is compressed or expanded by reciprocation of the push rod 13b. The return spring 15b, preferably, may be a coil spring. However, the present disclosure is not necessarily limited thereto and the return spring may be a plate spring or an elastomer such as rubber. Further, the return spring 15b, though not shown in the present disclosure, may be disposed in the housing of the electric booster unit 20b. The return spring 15b may be disposed in the master cylinder 14b or the electric booster unit 20b to be pressed by a portion of the force that is transmitted by the operating rod 12b and the electric booster unit 20b.

The electric booster unit 20b is configured to boost pedal effort by a driver. The electric booster unit 20b includes all or some of a motor 22b, a gear device 24b, a screw shaft 26b, and a motor piston 28b.

The motor 22b is configured to rotate forward or backward in response to a signal from the control unit 50b.

The gear device 24b is configured to transmit torque of the motor 22b to the screw shaft 26b. The gear device 24b includes all or some of a first gear 240b, a second gear 242b, and a third gear 244b.

The first gear 240b primarily receives torque transmitted from the motor 22b and transmits the torque to the second gear 242b. The second gear 242b transmits the torque received from the first gear 240b to the third gear 244b. The third gear 242b transmits the torque received from the second gear 242b to the screw shaft 26b. Depending on the ratio of the numbers of teeth of the first gear 240b to the third gear 244b, the rotation speed may decrease or increase at a predetermined ratio while torque is transmitted to the first gear 240b to the third gear 244b.

The screw shaft 26b is configured to convert torque transmitted by the gear device 24b into a straight motion. The screw shaft 26b includes all or some of a first shaft 260b and a second shaft 262b.

The first shaft 260b is rotated in a state restricted by the third gear 244b. The second shaft 262b is configured to convert a rotational motion of the first shaft 260b into a straight motion. Preferably, the first shaft 260b may be composed of a pinion, a second shaft 262b, and a rack. A first end of the second shaft 262b is connected to the motor piston 28b. Accordingly, when the motor 22b is driven, the second shaft 262b moves forward the reaction disc 420b or moves backward in the opposite direction.

The motor piston 28b is reciprocated in the longitudinal direction of the master cylinder 14b by force transmitted by a combination of the gear device 24b and the screw shaft 26b. The motor piston 28b is disposed such that a first end thereof is pressed by the second shaft 262b and a second end presses the reaction disc 420b.

The motor piston 28b is positioned close to the first shaft 260b when the pedal 11b is not pressed, that is, there is no braking request signal. Hereafter, the position of the motor piston 28b in the state described above is referred to as a 'setting position'.

The housing 30b is configured to surround at least a portion of the pedal mater unit 10b, at least a portion of the electric booster unit 20b, and at least a portion of the pedal force generating unit 40b. The housing 30b includes a spring mount 32b.

The spring mount 32b is fixed to the housing 30b and at least a portion of a pedal spring unit 44b is attached to a surface of the spring mount 32b. When a driver depresses the pedal and the pedal spring unit 44b is pressed, the spring mount 32b supports the pedal spring 44b.

When a driver presses the pedal 11b, the pedal force generating unit 40b provides pedal force to the driver. The pedal force generating unit 40b includes all or some of a disc unit 42b and a pedal spring unit 44b.

The disc unit 42b is disposed to be pressed by one or more of the operating rod 12b and the motor piston 28b. A reaction force generated against pedal force by the disc unit 42b is transmitted to the push rod 13b. The push rod 13b presses brake oil stored in the master cylinder 14b and at least some of the pressed disc oil is transmitted to the plurality of wheel brake assemblies, whereby a hydraulic braking force $F_{hyd}$ can be generated.

The disc unit 42b includes a reaction disc 420b and a reaction disc container 422b.

The reaction disc 420b is disposed to be pressed by the operating rod 12b. When a first end of the operating rod 12b is pressed by a force applied by a driver to depress the pedal 11b, a second end thereof presses the reaction disc 420b.

Further, the reaction disc 420b is disposed to be pressed by the motor piston 28b. Meanwhile, the reaction disc 420b and the motor piston 28b are in contact with each other even in the initial state in FIG. 12. However, unless a braking request signal is generated by the control unit 50b, the motor piston 28b may be spaced apart from the reaction disc 420b.

Figure 14A:
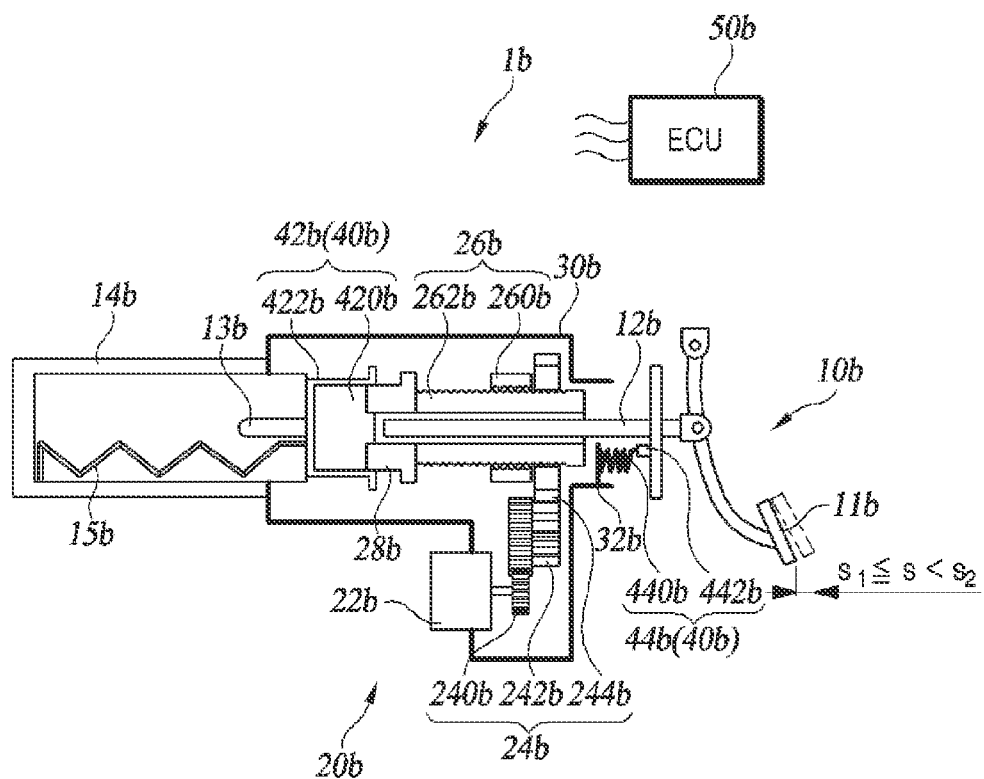
FIG. 14A is a conceptual diagram showing a first regenerative braking mode state of the brake system according to the second embodiment of the present disclosure.
Figure 14B:
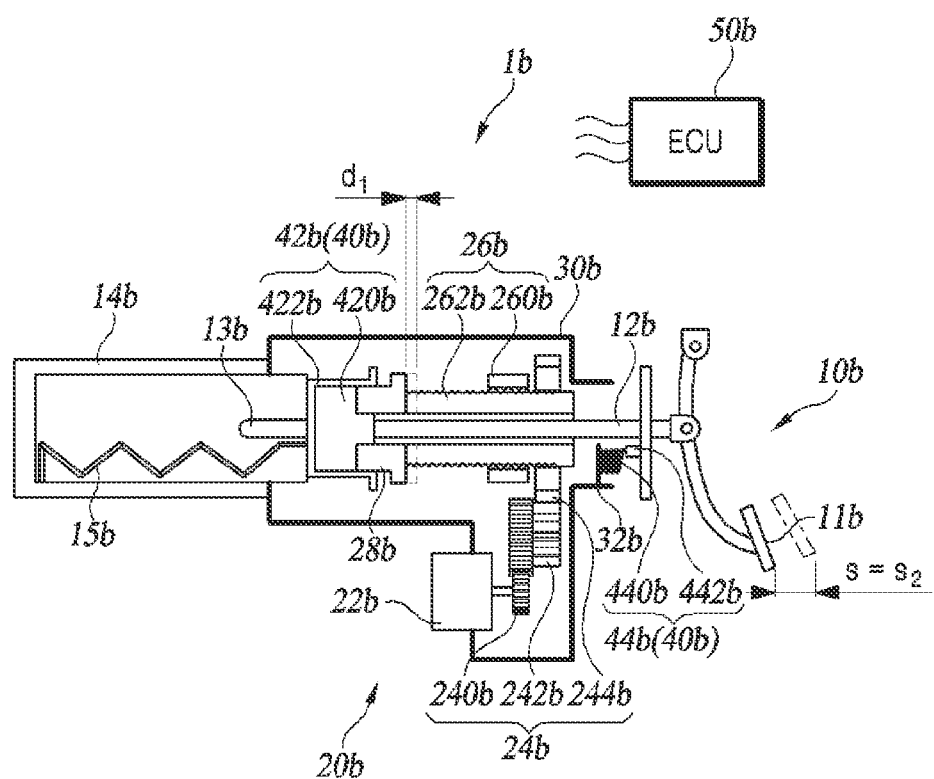
FIG. 14B is a conceptual diagram showing the state when a second regenerative braking mode of the brake system according to the second embodiment of the present disclosure is started.

Meanwhile, as the pedal 11b is pressed, an end of the operating rod 12b moves forward toward the reaction disc 420b, whereby they come in contact with each other, as shown in FIG. 14B. When the pedal 11b depressed as in FIG. 14B is further pressed, the outer circumference of the reaction disc 420b is pressed by the motor piston 28b and the center portion of the reaction disc 420b is pressed by the operating rod 12b. To this end, the end surface of the motor piston 28b may be formed substantially in an annular type and the operating rod 12b may pass through an open center portion of the motor piston 28b. In this case, the operating rod 12b and the reaction disc 420b are coaxially disposed. Meanwhile, the present disclosure is not necessarily limited thereto, and the outer circumference of the reaction disc 420b may be pressed by the operating rod 12b and the center portion of the reaction disc 420b may be pressed by the motor piston 28b. Even in this case, it is preferable that the operating rod 12b and the reaction disc 420b are coaxially disposed.

The reaction disc 420b is made of a compressible material. For example, at least a portion of the reaction disc 420b may be made of rubber. When the reaction disc 420b is pressed by one or more of the operating rod 12b and the motor piston 28b, the reaction force that is generated by the pressing force is transmitted to a driver through the operating rod 12b and consists a portion of the pedal force that the driver feels. Hereafter, the pedal force that is generated when the reaction disc 420b is compressed by an external force is indicated by $F_{RD}$.

The reaction disc container 422b is configured to accommodate at least a portion of the reaction disc 420b in an accommodation space formed therein. When a first side of the reaction disc container 422b is pressed by one or more of the operating rod 12b and the motor piston 28b, a second side of the reaction disc container 422b presses the push rod 13b.

The pedal spring unit 44b is connected to the operating rod 12b at a first side and to the spring mount 32b at a second side. When the relative distance between the pedal 11b and the spring mount 32b increases or decreases, the pedal spring unit 44b generates a tensile force or a compression force. The reaction force that is generated when the pedal spring unit 44b is compressed is transmitted to the driver through the operating rod 12b and constitutes a portion of the pedal force that the driver feels. Hereafter, the pedal force that is generated when the pedal spring unit 44b is compressed by an external force is indicated by $F_{spring}$.

The pedal spring unit 44b includes a spring 449b and a damper 442b. Although the spring 440b and the damper 442b are connected in series in the present disclosure, the present disclosure is not limited thereto, and the spring 440b and the damper 442b may be connected in parallel.

Total pedal force $F_{pedal}$ that is transmitted to a driver may be determined as the sum of pedal force $F_{RD}$ generated by a reaction force against a compression force of the disc unit 42b and pedal force $F_{spring}$ generated by a reaction force against a compression force of the pedal spring unit 44b.

The control unit 50b generates a braking request signal on the basis of a pedal stroke s received from a pedal travel sensor (not shown). The pedal request signal is an electrical signal that makes at least some of the plurality of wheel brake assemblies (not shown) generate a braking force.

The control unit 50b calculates a total requested braking force $F_{total}$ for braking a vehicle on the basis of the pedal stroke s. Further, the control unit 50b determines whether to perform regenerative braking, and differently controls the electric booster unit 20b, depending on whether to perform regenerative braking. The operation of the brake system 1b when a regenerative braking mode is started is described with reference to FIGS. 14 to 15 and the operation of the brake system 1b when a hydraulic braking mode is started is described with reference to FIGS. 16 to 17.

Dead Stroke State

Figure 13:
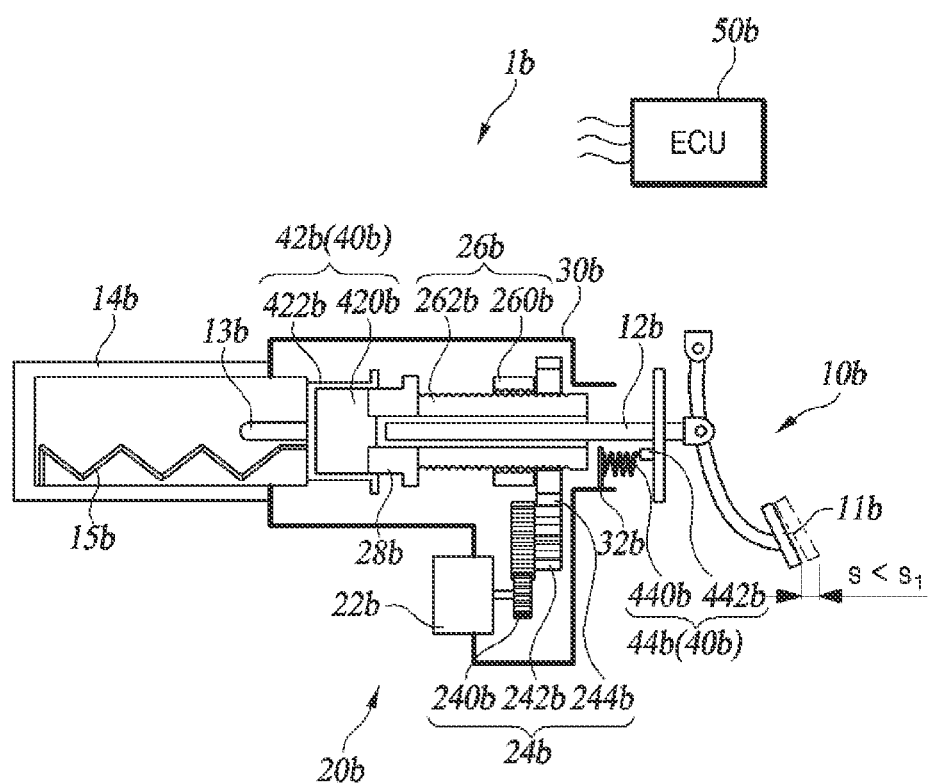
FIG. 13 is a conceptual diagram showing a dead stroke state of the brake system according to the second embodiment of the present disclosure.

FIG. 13 is a conceptual diagram showing a dead stroke state of the brake system according to the second embodiment of the present disclosure. In detail, FIG. 13 shows a state in which a driver starts to depress the pedal 11b, that is, a state in which a braking request signal starts to be generated by the control unit 50b. FIG. 13 shows a state in which a pedal stroke s satisfies s<$s_1$.

When a state changes from FIG. 12 to FIG. 13, that is, when s<$s_1$ and s increases, an end of the operating rod 12b does not come in contact with the reaction disc 420b even while the operating rod 12b moves forward. Accordingly, pedal force $F_{RD}$ generated by the reaction disc 420b is not transmitted to the driver. In this case, the distance between the spring mount 32b and the operating rod 12b decreases and at least a portion of the pedal spring 44b is compressed. $F_{spring}$ that is generated by a reaction force against the compression force of the pedal spring 44b is transmitted to the driver, and is $F_{pedal}$. That is, a relationship $F_{spring}$=$F_{pedal}$ is satisfied.

Even if the pedal 11b is depressed in the states in FIGS. 12 to 13, a regenerative braking force and a hydraulic braking force is not transmitted to the vehicle. That is, the brake system 1b is in a dead stroke period in the states shown in FIGS. 12 to 13.

Regenerative Braking Mode

The regenerative braking mode of the brake system according to the second embodiment of the present disclosure includes a first regenerative braking mode and a second regenerative braking mode.

When braking in the first regenerative braking mode, the braking system 1b performs braking using only regenerative braking provided in the vehicle. That is, the total requested braking force $F_{total}$ is satisfied even by only a regenerative braking force $F_{reg}$ that is generated by a regenerative braking unit (not shown). When braking in the second regenerative braking mode, the braking system 1b performs braking using both regenerative braking and hydraulic braking. That is, the total requested braking force $F_{total}$ is the sum of the regenerative braking force $F_{reg}$ and the hydraulic braking force $F_{hyd}$. In the present disclosure, the operation of the brake system in the first regenerative braking mode is described with reference to FIG. 14A and the operation of the brake system 1b in the second regenerative braking mode is described with reference to FIGS. 14b to 14c.

FIG. 14A is a conceptual diagram showing a first regenerative braking mode state of the brake system according to the second embodiment of the present disclosure.

In detail, a state of $s_1 \le s < s_2$ is shown in FIG. 14A. When s=$s_1$ is sensed by the pedal travel sensor, the control unit 50b controls the regenerative braking unit (not shown) to perform regenerative braking. When $s_1 \le s < s_2$ and s increases, the motor piston 28b moves forward and the reaction disc 420b is further compressed from the previous state. However, since the first end of the operating rod 12b and the reaction disc 420b are not in contact with each other, the pedal force $F_{RD}$ that is generated by the reaction disc 420b is not transmitted to the driver. Accordingly, the total pedal force $F_{pedal}$ is determined as only the pedal force $F_{spring}$ generated by the pedal spring 44b. That is, the brake system 1b satisfies $F_{pedal}$=$F_{spring}$ in the first regenerative braking mode.

Further, since the disk unit 42b is positioned within displacement in which hydraulic pressure is not generated in the first regenerative braking mode, the disc unit 42b does not transmit a force to the brake oil stored in the master cylinder 14b. Accordingly, the total requested braking force $F_{total}$ is determined as only the regenerative braking force $F_{reg}$. That is, the brake system 1b satisfies $F_{total}$=$F_{reg}$ in the first regenerative braking mode.

Figure 14C:
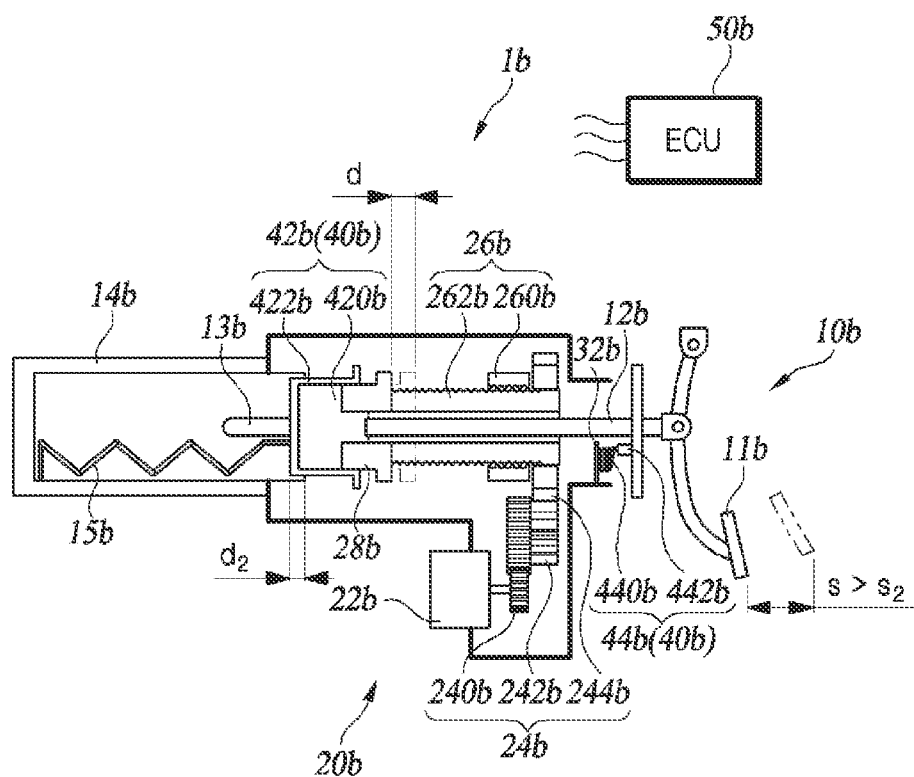
FIG. 14C is a conceptual diagram showing the state after the second regenerative braking mode of the brake system according to the second embodiment of the present disclosure is started.

FIGS. 14b and 14c are conceptual diagrams showing the state after a second regenerative braking mode of the brake system according to the second embodiment of the present disclosure is started. In detail, a state of s=$s_2$ is shown in FIG. 14B and a state of s>$s_2$ is shown in FIG. 14C. When s=$s_2$, the first end of the operating rod 12b and the reaction disc 420b are in contact with each other. Accordingly, $F_{RD}$ that is a reaction force against a compression force that is generated when the reaction disc 420b is pressed can be transmitted to the driver. Meanwhile, the displacement of the motor piston 28b generated to generate $F_{pedal}$, which is calculated by the control unit 50b to generate appropriate pedal force, is called first displacement $d_1$.

Further, at least a portion of the reaction disc container 422b is inserted into the master cylinder 14b from the point in time of s=$s_2$. That is, when the disc unit 42b presses the brake oil in the master cylinder 14b, a hydraulic braking force $F_{hyd}$ can be generated.

In the state of s≥$s_2$ shown in FIGS. 14b to 14c, the total pedal force $F_{pedal}$ is determined as the sum of the pedal force $F_{RD}$ generated by the disc unit 42b and the pedal force $F_{spring}$ generated by the pedal spring unit 44b. That is, the brake system 1b satisfies $F_{pedal}$=$F_{spring}$+$F_{RD}$ in the second regenerative braking mode.

Further, in a state of s≥$s_2$, the total requested braking force is determined as the sum of the hydraulic braking force $F_{hyd}$ and the regenerative braking force $F_{reg}$ that are generated when the disc unit 42b presses the inside of the master cylinder 14b. That is, the brake system 1b satisfies $F_{total}$=$F_{reg}$+$F_{hyd}$ in the second regenerative braking mode.

In the second regenerative braking mode, displacement d of the motor piston 28b is the sum of first displacement $d_1$ for generating $F_{RD}$ and second displacement $d_2$ for generating $F_{hyd}$.

Figure 15:
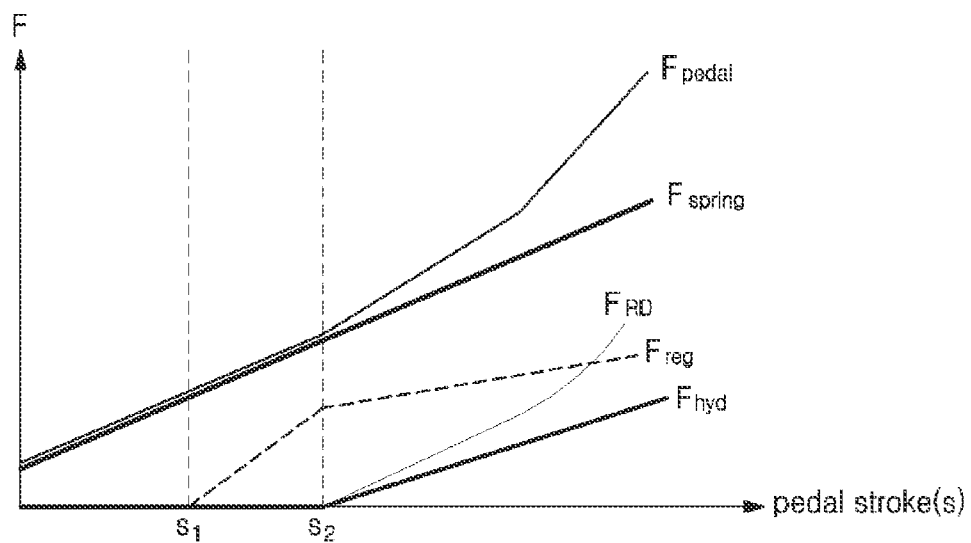
FIG. 15 is a graph showing the relationship between a pedal stroke and pedal force in each period in a regenerative braking mode of the brake system according to the second embodiment of the present disclosure.

FIG. 15 is a graph showing the relationship between a pedal stroke and pedal force in each period in a regenerative braking mode of the brake system according to the second embodiment of the present disclosure. Changes of pedal force and pressure of the brake system 1b in the states shown in FIGS. 12 to 14c are described on the basis of an increase of a pedal stroke s with reference to FIG. 15.

The operation state of the brake system 1b for s<$s_1$ corresponds to the operation state shown in FIG. 13. As the pedal 11b is depressed, the operating rod 12b is moved forward toward the reaction disc 420b. In this case, as shown in FIG. 13, the first end of the operating rod 12b is positioned in displacement that does not influence the total pedal force $F_{pedal}$. For example, the first end of the operating rod 12b may be spaced apart from the reaction disc 420b. Accordingly, the force constituting the total pedal force $F_{pedal}$ that is provided from a driver is only the pedal force $F_{spring}$ that is generated by the pedal spring unit 44b. Accordingly, when s<$s_1$, the brake system 1b according to the present disclosure satisfies $F_{pedal}$=$F_{spring}$. The pedal force $F_{spring}$ generated by the pedal spring unit 44b may substantially linearly increase in proportion to the compression force of the pedal spring unit 44b.

Meanwhile, this state is a dead stroke period in which a regenerative braking force $F_{reg}$ and a hydraulic braking force $F_{hyd}$ are not generated regardless of the pedal force by depression of the pedal 11b.

The operation state of the brake system 1b for $s_1 \le s < s_2$ corresponds to the operation state shown in FIG. 14A. As the pedal 11b is depressed, the motor piston 28b further moves forward from the state shown in FIG. 13 and presses the reaction disc 420b. However, since the first end of the operating rod 12b is spaced apart from the reaction disc 420b, the force constituting $F_{pedal}$ is only $F_{spring}$. Accordingly, when $s_1 \leq s < s_2$, the brake system 1b according to the present disclosure satisfies $F_{pedal} = F_{spring}$ in the regenerative braking mode. The pedal force $F_{spring}$ generated by the pedal spring unit 44b may substantially linearly increase in proportion to the compression force of the pedal spring unit 44b.

Meanwhile, in this state, a regenerative braking force $F_{reg}$ is generated. Accordingly, when $s_1 \leq s < s_2$, the brake system 1b according to the present disclosure satisfies $F_{total} = F_{reg}$ in the regenerative braking mode.

The operation state of the brake system 1b for $s=s_2$ corresponds to the operation state shown in FIG. 14B. The motor piston 28b moves forward and the center portion of the reaction disc 420b of which the outer circumference is further pressed further protrudes. Further, the operating rod 12b also moves forward. Accordingly, the first end of the operating rod 12b comes in contact with the reaction disc 420b at the point in time of $s=s_2$. Accordingly, the pedal force $F_{RD}$ that is generated by the reaction disc 420b can be transmitted to the driver. Accordingly, when $s=s_2$, the brake system 1b according to the present disclosure satisfies $F_{pedal} = F_{spring} + F_{RD}$ in the regenerative braking mode.

Meanwhile, in this state, the disc unit 42b starts to press the brake oil stored in the master cylinder 14b, whereby a hydraulic braking force $F_{hyd}$ is generated. Accordingly, when $s=s_2$, the brake system 1b according to the present disclosure satisfies $F_{total} = F_{reg} + F_{hyd}$ in the regenerative braking mode.

The operation state of the brake system 1b for $s > s_2$ corresponds to the operation state shown in FIG. 14C. When $s > s_2$, the brake system 1b according to the present disclosure satisfies $F_{pedal} = F_{spring} + F_{RD}$ in the regenerative braking mode. Meanwhile, pedal force that is generated by a reaction force against the compression force of the return spring 15b disposed in the master cylinder 14b is not considered in the present disclosure.

The force of the operating rod 12b pressing the reaction disc 420b and the force of the motor piston 28b pressing the reaction disc 420b are transmitted to the brake oil stored in the master cylinder 14b. At least a portion of the force that is transmitted to the master cylinder 14b generates a hydraulic braking force $F_{hyd}$. Accordingly, when $s > s_2$, the brake system 1b according to the present disclosure satisfies $F_{total} = F_{reg} + F_{hyd}$ in the regenerative braking mode.

Hydraulic Braking Mode

The brake system 1b according to the second embodiment of the present disclosure performs braking without using a regenerative braking unit provided in a vehicle when braking in the hydraulic braking mode. Accordingly, the total requested braking force $F_{total}$ is satisfied by only the hydraulic braking force $F_{hyd}$. Accordingly, the brake system 1b satisfies $F_{total} = F_{hyd}$ in the entire period of the hydraulic braking mode.

The hydraulic braking mode of the brake system according to the second embodiment of the present disclosure includes a first hydraulic braking mode and a second hydraulic braking mode. In the first hydraulic braking mode, the total pedal force $F_{pedal}$ is satisfied by only the pedal force $F_{spring}$ generated by the pedal spring unit 44b. In the second hydraulic braking mode, the total pedal force $F_{pedal}$ is satisfied by only the sum of $F_{spring}$ and the pedal force $F_{RD}$ generated by the disc unit 42b. In the present disclosure, the operation of the brake system in the first hydraulic braking mode is described with reference to FIG. 16A and the operation of the brake system 1b in the second hydraulic braking mode is described with reference to FIGS. 16b to 16c.

Meanwhile, the operation state of the brake system 1b for $s < s_3$ may be the same as or has identity as the operation state of the brake system 1b for $s < s_1$ in the regenerative braking mode, so the description referring to FIGS. 12 and 13 is referred to for this case.

Figure 16A:
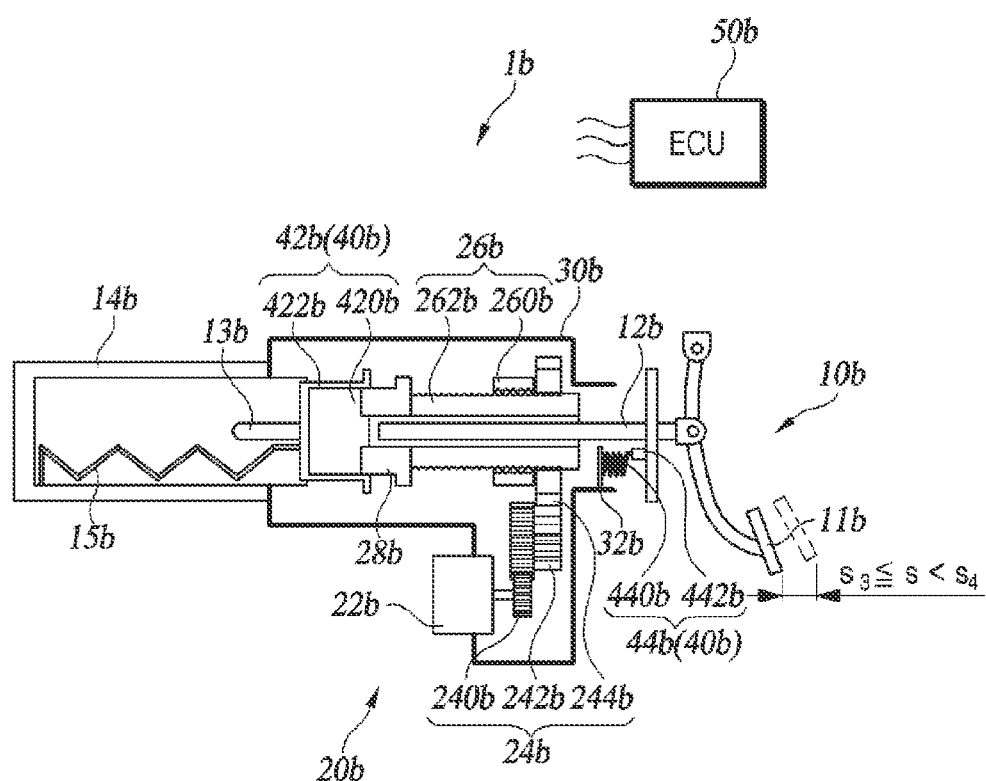
FIG. 16A is a conceptual diagram showing a first hydraulic braking mode state of the brake system according to the second embodiment of the present disclosure.

FIG. 16A is a conceptual diagram showing a first hydraulic braking mode state of the brake system according to the second embodiment of the present disclosure. In detail, a state $s_3 \leq s < s_4$ is shown in FIG. 16A. When $s=s_3$ is sensed by the pedal travel sensor, the control unit 50b controls the brake system 1b to perform hydraulic braking using the pedal master unit 10b. When $s_3 \leq s < s_4$ and s increases, the motor piston 28b moves forward and the reaction disc 420b is further compressed from the previous state. However, since the first end of the operating rod 12b and the reaction disc 420b are not in contact with each other, the pedal force $F_{RD}$ that is generated by the reaction disc 420b is not transmitted to the driver. Accordingly, the total pedal force $F_{pedal}$ is determined as only the pedal force $F_{spring}$ generated by the pedal spring 44b. That is, the brake system 1b satisfies $F_{pedal} = F_{spring}$ in the first hydraulic braking mode. Meanwhile, the pedal force $F_{spring}$ generated by the pedal spring unit 44b may substantially linearly increase in proportion to the compression force of the pedal spring unit 44b.

Figure 16B:
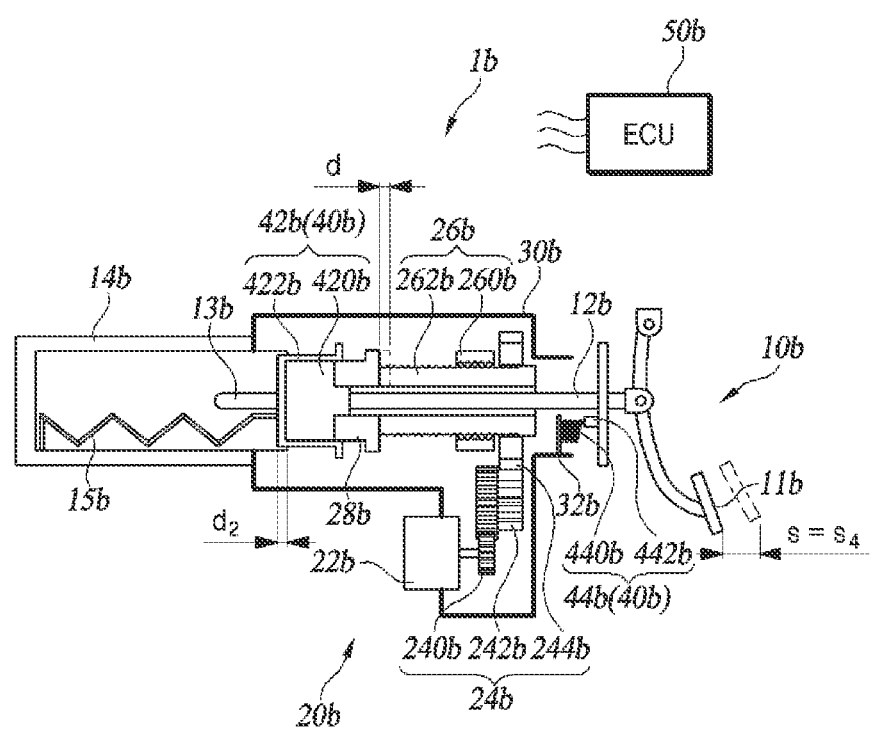
FIG. 16B is a conceptual diagram showing the state when a second hydraulic braking mode of the brake system according to the second embodiment of the present disclosure is started.
Figure 16C:
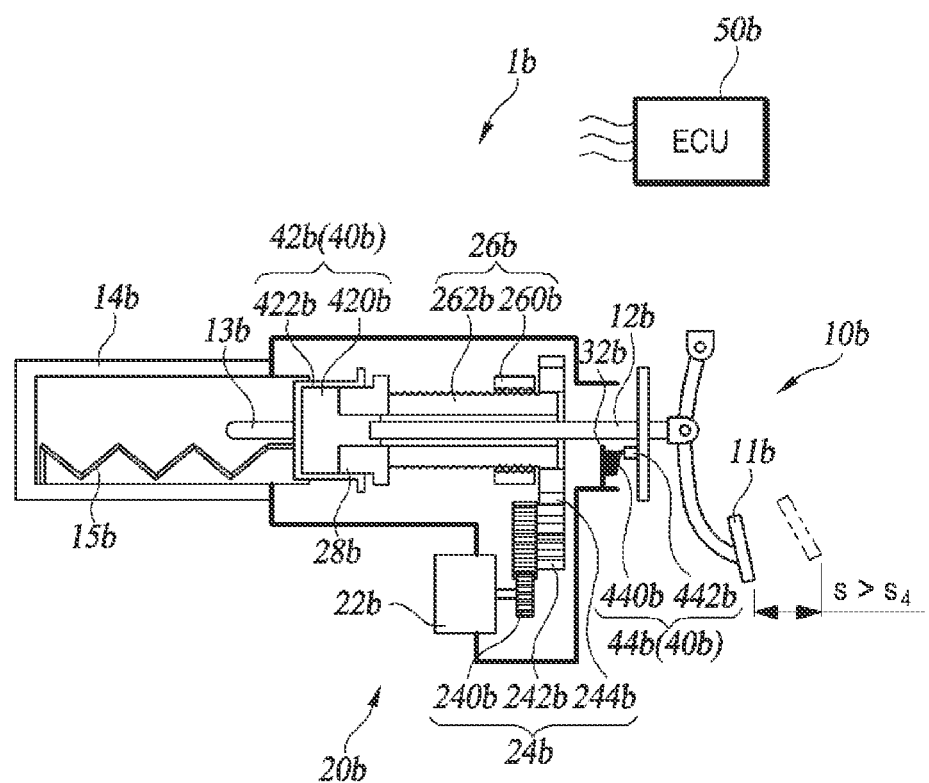
FIG. 16C is a conceptual diagram showing the state after the second hydraulic braking mode of the brake system according to the second embodiment of the present disclosure is started.

FIGS. 16b and 16c are conceptual diagrams showing the state after a second hydraulic braking mode of the brake system according to the second embodiment of the present disclosure is started. In detail, a state of $s=s_4$ is shown in FIG. 16B and a state of $s > s_4$ is shown in FIG. 16C. When $s=s_4$, the first end of the operating rod 12b and the reaction disc 420b are in contact with each other. Accordingly, $F_{RD}$ that is a reaction force against a compression force that is generated when the reaction disc 420b is pressed can be transmitted to the driver. That is, the brake system 1b according to the present disclosure satisfies $F_{pedal} = F_{spring} + F_{RD}$ in the second hydraulic braking mode. Meanwhile, the pedal force $F_{spring}$ generated by the pedal spring unit 44b may substantially linearly increase in proportion to the compression force of the pedal spring unit 44b.

Figure 17:
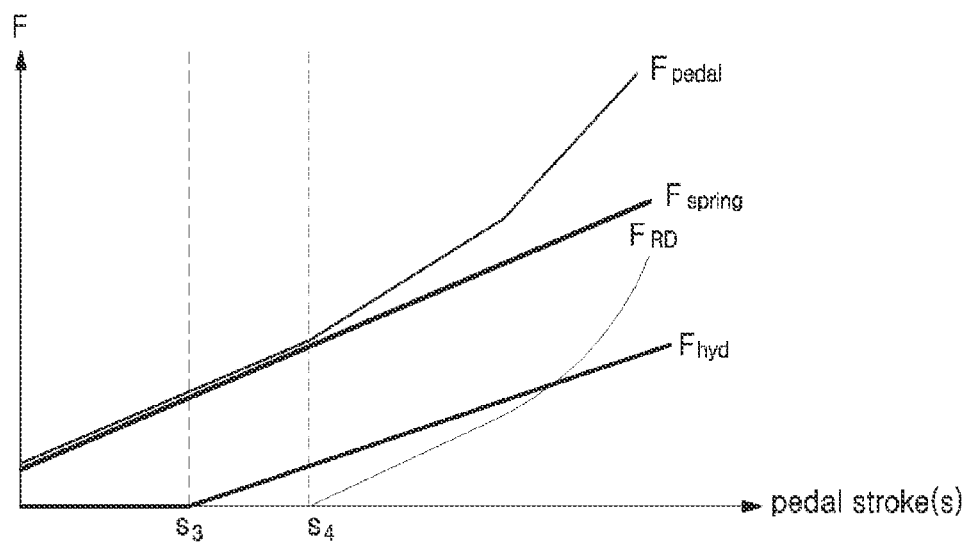
FIG. 17 is a graph showing the relationship between a pedal stroke and pedal force in each period in a hydraulic braking mode of the brake system according to the second embodiment of the present disclosure.

FIG. 17 is a graph showing the relationship between a pedal stroke and pedal force in each period in a hydraulic braking mode of the brake system according to the second embodiment of the present disclosure. Changes of pedal force and pressure of the brake system 1b in the states shown in FIGS. 16a to 16c are described on the basis of an increase of a pedal stroke $s_b$ with reference to FIG. 17.

The operation state of the brake system 1b for $s < s_3$ corresponds to the operation state shown in FIGS. 12 to 13. The description about $s < s_1$ in the regenerative braking mode is referred to for this period.

The operation state of the brake system 1b for $s_3 \leq s < s_4$ corresponds to the operation state shown in FIG. 16A. As the pedal 11b is depressed, the motor piston 28b further moves forward from the state shown in FIG. 13 and presses the reaction disc 420b. However, since the first end of the operating rod 12b is spaced apart from the reaction disc 420b, the force constituting $F_{pedal}$ is only $F_{spring}$. Accordingly, when $s_3 \leq s < s_4$, the brake system 1b according to the present disclosure satisfies $F_{pedal} = F_{spring}$ in the hydraulic braking mode. The pedal force $F_{spring}$ W generated by the pedal spring unit 44b may substantially linearly increase in proportion to the compression force of the pedal spring unit 44b.

The operation state of the brake system 1b for s=s₄ corresponds to the operation state shown in FIG. 16B. The motor piston 28b moves forward and the center portion of the reaction disc 420b of which the outer circumference is further pressed further protrudes. Further, the operating rod 12b also moves forward. Accordingly, the first end of the operating rod 12b comes in contact with the reaction disc 420b at the point in time of s=s₄. Accordingly, the pedal force $F_{RD}$ that is generated by the reaction disc 420b can be transmitted to the driver. Accordingly, when s=s₂, the brake system 1b according to the present disclosure satisfies $F_{pedal}=F_{spring}+F_{RD}$ in the hydraulic braking mode. The pedal force $F_{spring}$ generated by the pedal spring unit 44b may substantially linearly increase in proportion to the compression force of the pedal spring unit 44b.

The operation state of the brake system 1b for s>s₄ corresponds to the operation state shown in FIG. 16C. When s>s₄, the brake system 1b according to the present disclosure satisfies $F_{pedal}=F_{spring}+F_{RD}$ in the regenerative braking mode. Meanwhile, pedal force that is generated by a reaction force against the compression force of the return spring 15b disposed in the master cylinder 14b is not considered in the present disclosure.

Method of Controlling Brake System

Figure 18:
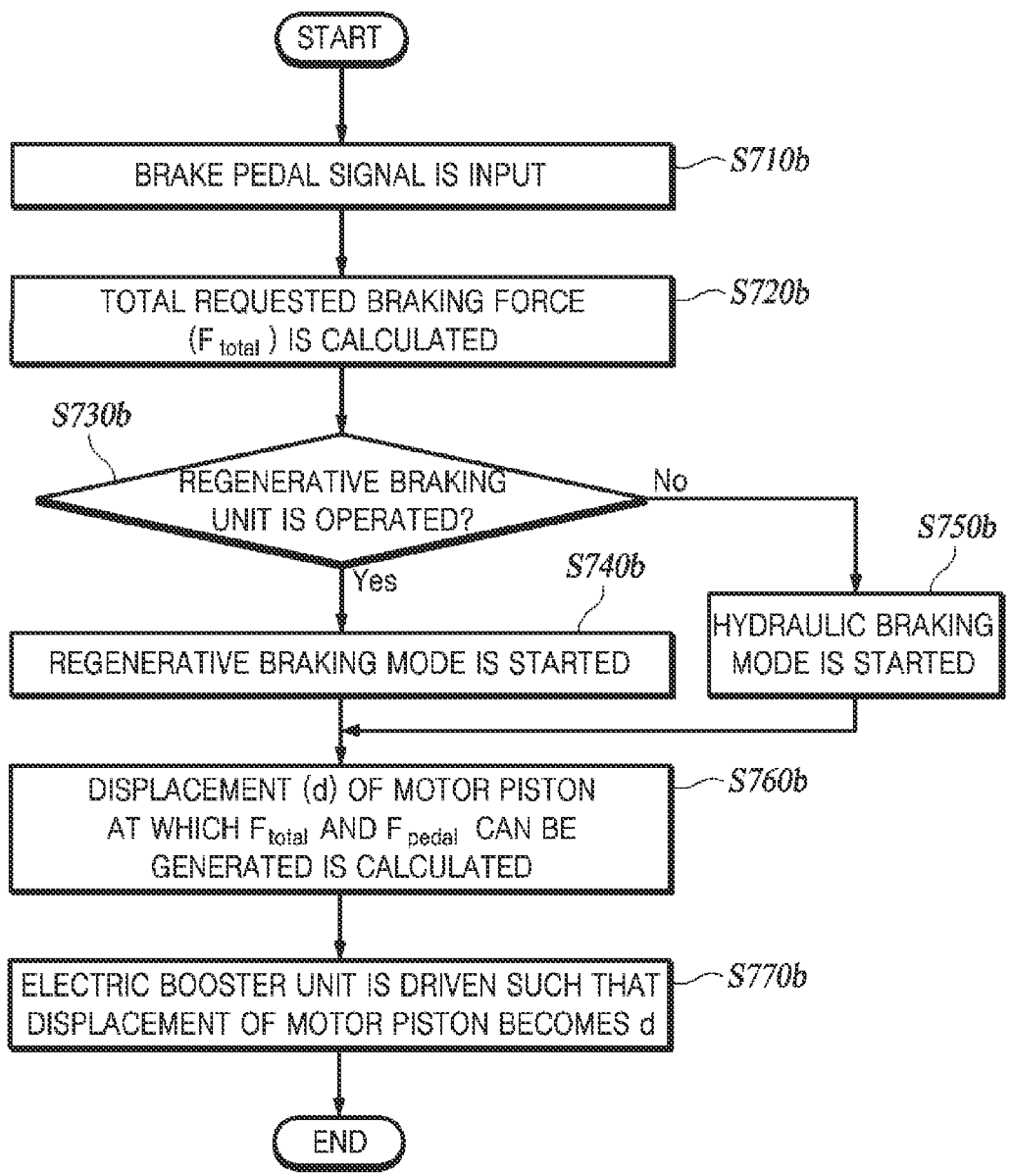
FIG. 18 is a flowchart showing a method of controlling the brake system according to the second embodiment of the present disclosure.
Figure 19:
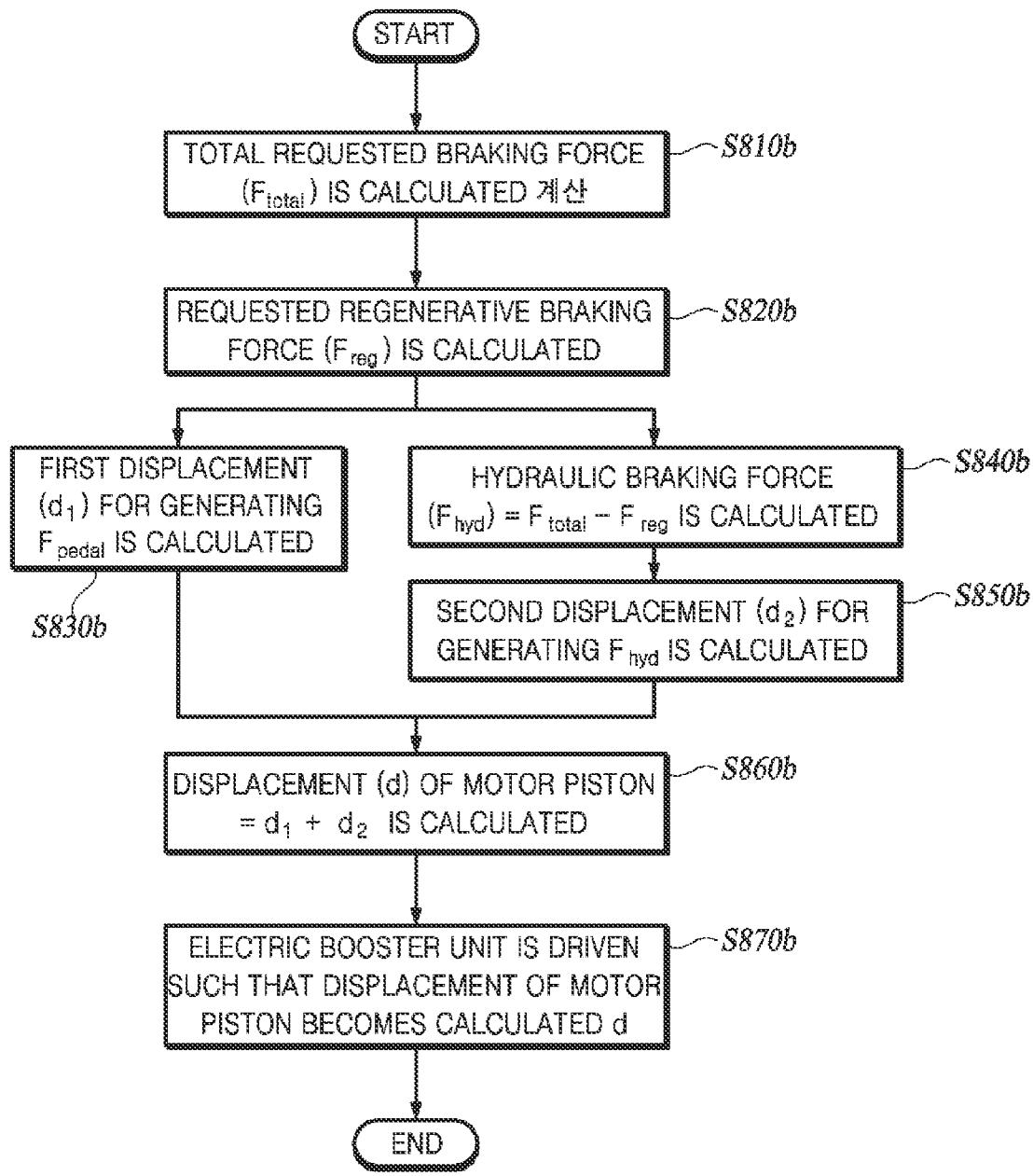
FIG. 19 is a flowchart showing a control method in the second regenerative braking mode state of the brake system according to the second embodiment of the present disclosure.

Although the processes shown in FIGS. 18 to 19 are sequentially performed in time series in the present disclosure, it should be noted that some or all of the processes may be simultaneously performed regardless of the sequence.

FIG. 18 is a flowchart showing a method of controlling the brake system according to the second embodiment of the present disclosure.

Referring to FIG. 18, when a driver depresses the pedal 11b, a brake pedal signal is input to the control unit 50b (S700b).

When the brake pedal signal is input, the control unit 50b calculates a total requested braking force $F_{total}$ on the basis of a stroke value sensed by the pedal travel sensor PTS (S710b).

Thereafter, the control unit 50b determines whether to brake the vehicle using the regenerative braking mode (S720b). The braking force generated by the regenerative braking unit in this case is defined as a regenerative braking force $F_{reg}$.

When the control unit 50b determines to drive the regenerative braking unit, the control unit 50b brakes the vehicle by staring the regenerative braking mode (S740b). Meanwhile, when determining not to drive the regenerative braking unit, the control unit 50b brakes the vehicle by starting the hydraulic braking mode (S750b).

When the regenerative braking mode or the hydraulic braking mode is started, the control unit 50b calculates displacement of $d_b$ of the motor piston in which a total requested braking force $F_{total}$ and total pedal force $F_{pedal}$ can be generated (S760b).

The control unit 50b drives the electric booster unit 20b on the basis of the calculated displacement d, thereby controlling the brake system 1b such that the motor piston can move the desired d (S770b).

FIG. 19 is a flowchart showing a control method in the second regenerative braking mode state of the brake system according to the second embodiment of the present disclosure. A detailed control method of the electric booster unit 20b in the second regenerative braking mode is described with reference to FIG. 19. Meanwhile, the content about S810b of FIG. 19 is the same as the process of S710b of FIG. 18, so it is not described in detail.

In the second regenerative braking mode, the control unit 50b calculates a requested regenerative braking force a $F_{reg}$ (S820b).

In this case, the controller 50b calculates first displacement $d_1$ of the motor piston 28b such that appropriate pedal force $F_{pedal}$ is transmitted to the driver on the basis of the sensed pedal stroke s (S830b). Meanwhile, although the reference point of $d_1$ is described and shown as an end of the motor piston 28b at a setting position in the present disclosure (see FIG. 14B), the reference point is not necessarily limited thereto. For example, $d_1$ may be a distance from a first shaft 260b that is a fixed component.

The control unit 50b calculates an appropriate hydraulic braking force $F_{hyd}$ on the basis of the sensed pedal stroke s. In this case, $F_{hyd}=F_{total}-F_{reg}$ is used for the calculation (S840b).

The control unit 50b calculates second displacement $d_2$ of the motor piston 28b such that an appropriate hydraulic braking force $F_{hyd}$ is generated on the basis of the sensed pedal stroke $s_b$ (S850b).

The control unit 50b calculates appropriate displacement d of the motor piston using $d_1$ and $d_2$. In this case, $d=d_1+d_2$ is satisfied. Thereafter, the control unit derives the electric booster unit 20b using the calculated d such that the displacement of the motor piston is the calculated d (S870b).

Hereafter, a brake system according to a third embodiment of the present disclosure and a method of controlling the brake system are described.

Figure 20:
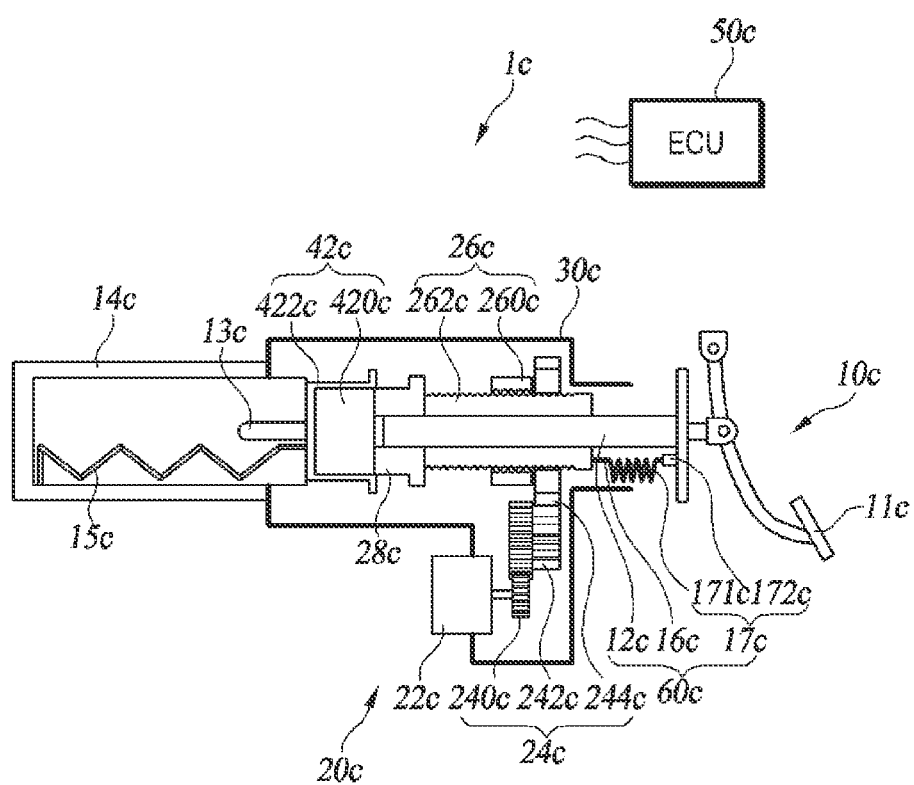
FIG. 20 is a cross-sectional view of a brake system according to a third embodiment of the present disclosure.

FIG. 20 is a cross-sectional view of a brake system according to a third embodiment of the present disclosure.

Referring to FIG. 20, a brake system 1c according to a third embodiment of the present disclosure includes all or some of a pedal master unit 10c, an electric booster unit 20c, a housing 30c, a disc unit 42c, and an electric control unit 50c.

The pedal master unit 10c includes all or some of a pedal 11c, a rod assembly 60c, a push rod 13c, a master cylinder 14c, and a return spring 15c.

The pedal 11c is a part that is depressed by a driver to decelerate or stop a vehicle. When a driver depresses the pedal 11c and a first end of the operating rod 12c is pressed at a predetermined pressure or more, the operating rod 12b moves toward a reaction disc 420c. In this case, the stroke of the pedal 11c may be sensed by a pedal travel sensor (not shown) that is separately provided. The first end of the operating rod 12c may be disposed in contact with the center portion of the reaction disc 420c.

The rod assembly 60c includes an operating rod 12c, an elastomer 17c, and an elastomer connector 16c.

The operating rod 12c is a medium that transmits pedal effort by a driver to the reaction disc 420c. The first end of the operating rod 12c is connected to the pedal 11c. The operating rod 12c can press the master cylinder 14c by pushing the reaction disc 420c toward the master cylinder 14c in cooperation with the motor piston 28c. In the initial state in which the pedal 11c starts to be depressed, the second end of the operating rod 12c may be spaced apart from the reaction disc 420c. As the pedal 11c is depressed, the second end of the operating rod 12b is moved forward toward the reaction disc 420c.

A first end of the elastomer 17c is in contact with the operating rod 12c and a second end thereof is disposed in contact with the elastomer connector 16c. The elastomer connector 16c may be formed on a first surface of a screw shaft, as shown in FIG. 20, but may be formed at a portion of a second surface on which the motor piston 28c is in contact with the reaction disc 420c, as shown in FIG. 23.

Further, the elastomer connector 16c may be formed in a space in which it can move with a straight motion of the motor piston 28c.

The elastomer 17c generates an elastic force in response to movement of the operating rod 12c. In detail, when a driver depresses the pedal 11c, the operating rod 12c compresses the elastomer 17c while moving toward the reaction disc 420c. The compressed elastomer 17c generates a reaction force that is an elastic force, thereby providing pedal force to the driver. Since the second end of the elastomer 17c is disposed in contact with the elastomer connector 16c, the elastomer 17c is influenced by only displacement of the operating rod 12c and displacement of the motor piston 28c. Even if the operating rod 12c is not in contact with the reaction disc 420c and a reaction force is not generated from the reaction disc 420c, the driver can feel pedal force by the reaction force of the elastomer 17c.

The elastomer 17c may be a spring or may be a combination of a spring 171c and a damper 172c. Although a spring 171c and a damper 172c are connected in series in the present disclosure, the present disclosure is not limited thereto, and the spring 171c and the damper 172c may be connected in parallel.

The push rod 13c is at least partially inserted in the master cylinder 14c. The push rod 13c reciprocates in the longitudinal direction of the master cylinder 14c in the master cylinder 14c, and can press a brake liquid stored in the master cylinder 14c when moving forward.

The master cylinder 14c is configured to keep a brake liquid therein. Hydraulic pressure that is used for braking is generated when the brake liquid in the master cylinder 14c is pressed. The generated hydraulic pressure is transmitted to a plurality of wheel brakes (not shown).

The return spring 15c is disposed in the master cylinder 14c and is compressed or expanded by reciprocation of the push rod 13c. The return spring 15c, preferably, may be a coil spring. However, the present disclosure is not necessarily limited thereto and the return spring may be a plate spring or an elastomer such as rubber. Further, the return spring 15c, though not shown in the present disclosure, may be disposed in the housing of the electric booster unit 20c. The return spring 15c may be disposed in the master cylinder 14c or the electric booster unit 20c to be pressed by a portion of the force that is transmitted by any one or more of the operating rod 12c and the electric booster unit 20c.

The electric booster unit 20c is configured to boost pedal effort by a driver. The electric booster unit 20c includes all or some of a motor 22c, a gear device 24c, a screw shaft 26c, and a motor piston 28c.

The motor 22c is configured to rotate forward or backward about the axis of the motor 22c in response to a signal from the control unit 50c.

The gear device 24c is configured to transmit torque of the motor 22c to the screw shaft 26c. The gear device 24c includes all or some of a first gear 240c, a second gear 242c, and a third gear 244c.

The first gear 240c primarily receives torque transmitted from the motor 22c and transmits the torque to the second gear 242c. The second gear 242c transmits the torque received from the first gear 240c to the third gear 244c. The third gear 242c transmits the torque received from the second gear 242c to the screw shaft 26c. Depending on the ratio of the numbers of teeth of the first gear 240c to the third gear 244c, the rotation speed may decrease or increase at a predetermined ratio while torque is transmitted to the first gear 240c to the third gear 244c.

The screw shaft 26c is configured to convert torque transmitted by the gear device 24c into a straight motion. The screw shaft 26c includes all or some of a first shaft 260c and a second shaft 262c.

The first shaft 260c is rotated in a state restricted by the third gear 244c. The second shaft 262c is configured to convert a rotational motion of the first shaft 260c into a straight motion. Preferably, the first shaft 260c may be composed of a pinion, a second shaft 262c, and a rack. A first end of the second shaft 262c is connected to the motor piston 28c. Accordingly, when the motor 22c is driven, the second shaft 262c moves forward the reaction disc 420c or moves backward in the opposite direction.

The motor piston 28c is reciprocated in the longitudinal direction of the master cylinder 14c by force transmitted by a combination of the gear device 24c and the screw shaft 26c. The motor piston 28c is disposed such that a first end thereof is pressed by the second shaft 262c and a second end presses the reaction disc 420c.

The motor piston 28c is positioned close to the first shaft 260c when the pedal 11c is not pressed, that is, there is no braking request signal.

The housing 30c is configured to surround at least a portion of the pedal mater unit 10c, at least a portion of the electric booster unit 20c, and at least a portion of the disc unit 42c.

When the control unit 50c performs hydraulic braking, the disc unit 42c presses the master cylinder 14c, whereby hydraulic pressure is provided to the plurality of wheel brakes (not shown). The disc unit 42c includes a reaction disc 420c and a reaction disc container 422c.

The reaction disc 420c is disposed to be pressed by any one or more of the operating rod 12c and the motor piston 28c. The reaction disc 420c and the motor piston 28c are in contact with each other in FIG. 20 of the present disclosure. However, unless a braking request signal is generated by the control unit 50c, the motor piston 28b may be spaced apart from the reaction disc 420c.

The reaction disc 420c may be disposed such that the outer circumference of the reaction disc 420c, that is, the outer edge is pressed by the motor piston 28c and the center portion of the reaction disc 420c is pressed by the operating rod 12c. To this end, the end surface of the motor piston 28c may be formed substantially in an annular type and the operating rod 12c may pass through a hollow portion formed at the center of the motor piston 28c. In this case, the operating rod 12c and the reaction disc 420c are coaxially disposed. Meanwhile, the present disclosure is not limited thereto, and other brake systems are included in the present disclosure as long as the brake systems have a device that can press the reaction disc 420c when the pedal 11c is depressed and the motor 22c is driven.

The reaction disc 420c is made of a compressible elastic material. For example, at least a portion of the reaction disc 420c may be made of rubber. When the reaction disc 420c is pressed by one or more of the operating rod 12c and the motor piston 28c, the reaction force that is generated by the pressing force is transmitted to a driver through the operating rod 12c and consists a portion of the pedal force that the driver feels.

The reaction disc container 422c is configured to accommodate at least a portion of the reaction disc 420c in an accommodation space formed therein. When a first side of the reaction disc container 422c is pressed by one or more of the operating rod 12c and the motor piston 28c, a second side of the reaction disc container 422c presses the push rod 13c.

The total pedal force that is provided to a driver may be determined as the sum of the pedal force that is generated by a reaction force against the compression force of the reaction disc 420c and the pedal force that is generated by a reaction force against the compression force of the elastomer 17c.

The control unit 50c generates a braking request signal on the basis of a depression signal received from a pedal travel sensor (not shown). The pedal request signal is an electrical signal that makes at least some of the plurality of wheel brakes (not shown) generate a braking force.

The control unit 50c calculates a total requested braking force for braking the vehicle on the basis of a depression signal. Further, the control unit 50c determines whether to perform any one or more of regenerative braking and hydraulic braking and may apply a regenerative braking force or control the electric booster unit 20c in another way, depending on whether regenerative braking and/or hydraulic braking is performed. In this case, the total requested braking force may be the sum of a hydraulic braking force and a regenerative braking force. A plurality of modes may be set in the braking mode. For example, the control mode 50c may set a hydraulic braking mode in which braking is performed by only a hydraulic braking force, a regenerative braking mode in which braking is performed by only a regenerative braking force, and a combined braking mode in which braking is performed by both a hydraulic braking force and regenerative braking force in order to brake a vehicle.

FIG. 21 is a schematic diagram illustrating the relationship between an elastic reaction disc, an operating rod, and a motor piston, and pedal force.

Figure 21A:
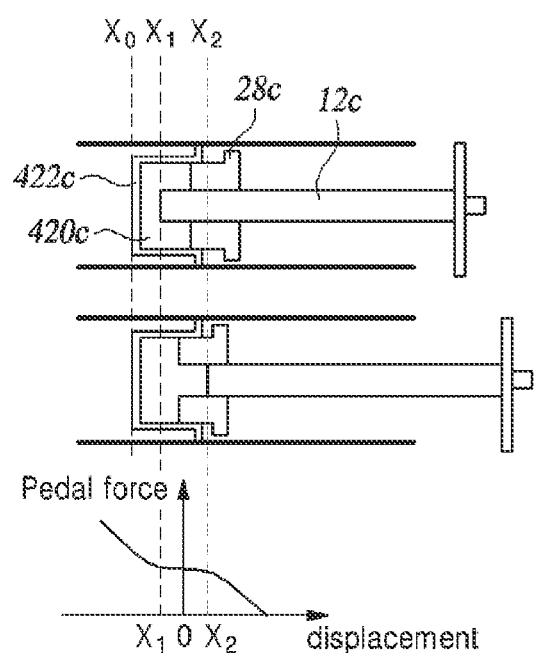
FIG. 21 is a schematic diagram illustrating the relationship between an elastic reaction disc, an operating rod, and a motor piston, and pedal force.
Figure 21B:
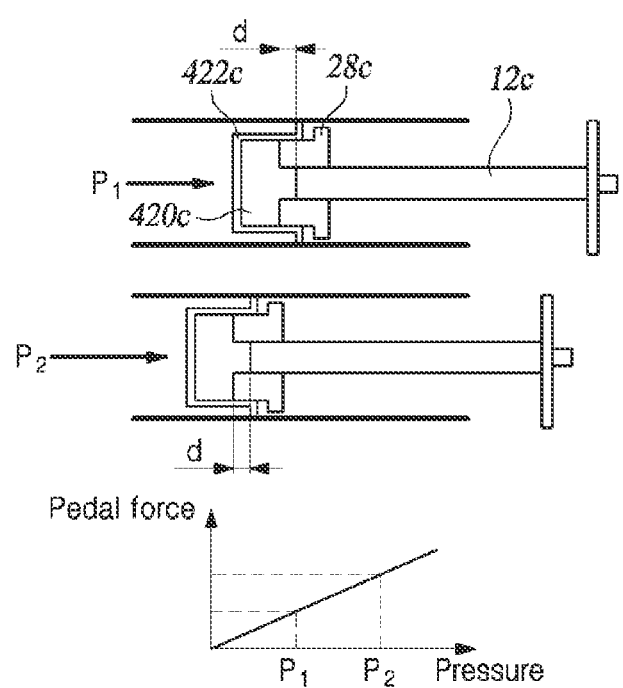

FIG. 21A is a schematic view illustrating pedal force according to displacement of the operating rod 12c without displacement of the reaction disc 420c changed. FIG. 21B is a schematic view illustrating pedal force according to the magnitude of pressure that is applied in the master cylinder 14c when relative displacement of the motor piston 28c and the operating rod 12c is constant.

Referring to FIG. 21A, it can be seen that pedal force increases when the operating rod 12c moves toward the reaction disc 420c, and pedal force decreases when it moves in the opposite direction. However, the pedal force that a driver feels little changes when the difference between the displacement of the operating rod 12c and the displacement of the reaction disc 420c within a predetermined range. This is because the reaction disc 420c is made of an elastic material.

Referring to FIG. 21B, the difference between the displacement of the motor piston 28c and the displacement of the operating rod 12c is maintained at constant level, and when the hydraulic pressure in the master cylinder 14c is increased by pressing the reaction disc 420c, the pedal force that a driver feels increases in accordance with the magnitude of the hydraulic pressure in the master cylinder 14c rather than the displacement of the motor piston 28c and the operating rod 12c.

Figure 22:
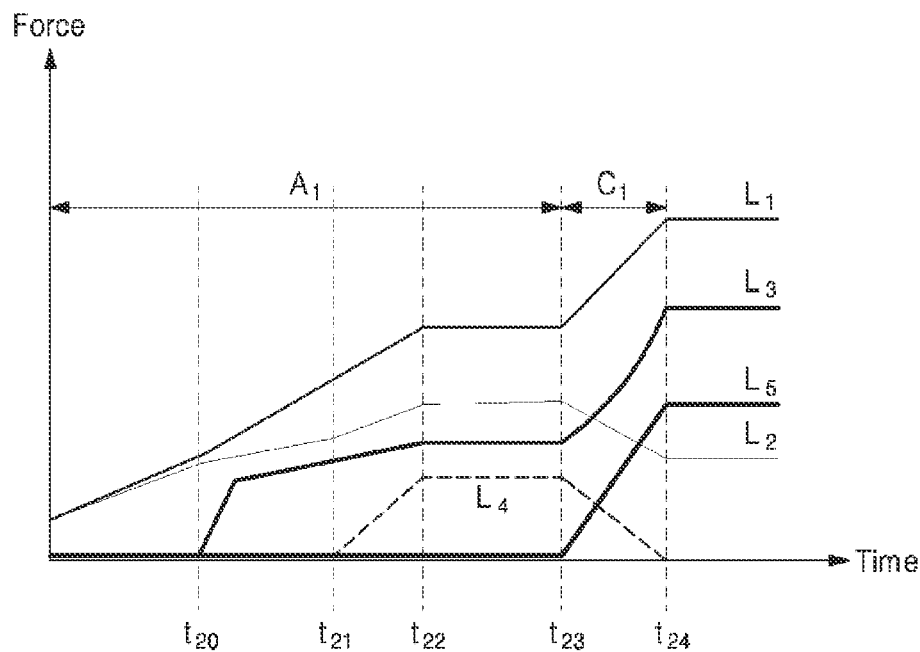
FIG. 22 is a graph illustrating the relationship between total pedal force, pedal force of an elastomer, pedal force of a reaction disc, a regenerative braking force, and a hydraulic braking force over time when regenerative braking is stopped in a situation in which a control unit performs only regenerative braking during braking.

FIG. 22 is a graph illustrating the relationship between total pedal force, pedal force of an elastomer, pedal force of a reaction disc, a regenerative braking force, and hydraulic braking force over time when regenerative braking is stopped when a control unit performs only regenerative braking during braking. FIG. 23 is a schematic diagram illustrating an operation at a start point and time points $t_{13}$ and $t_{14}$ in FIG. 22.

In the graphs shown in FIGS. 22, 24, 26, and 28, $L_1$ is total pedal force, $L_2$ is pedal force of the elastomer 17c, $L_3$ is pedal force of the reaction disc 420c, $L_4$ is a regenerative braking force, and $L_5$ is a hydraulic braking force.

Figure 23A:
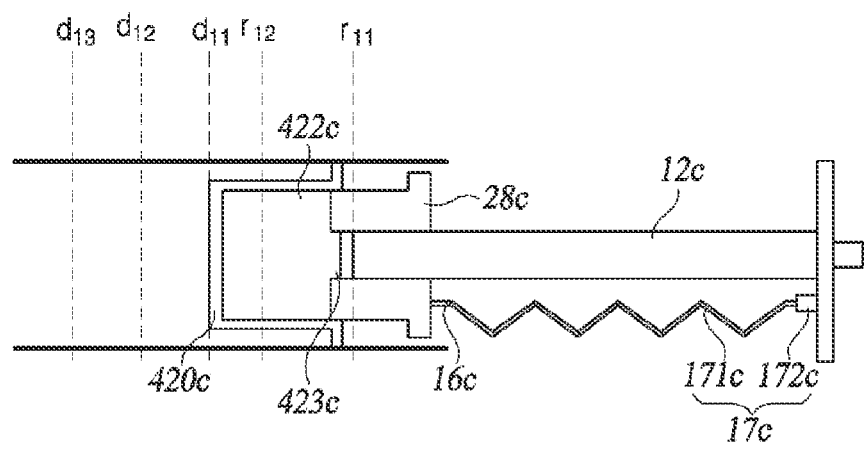
FIG. 23A shows an operation at a start point of FIG. 22.
Figure 23B:
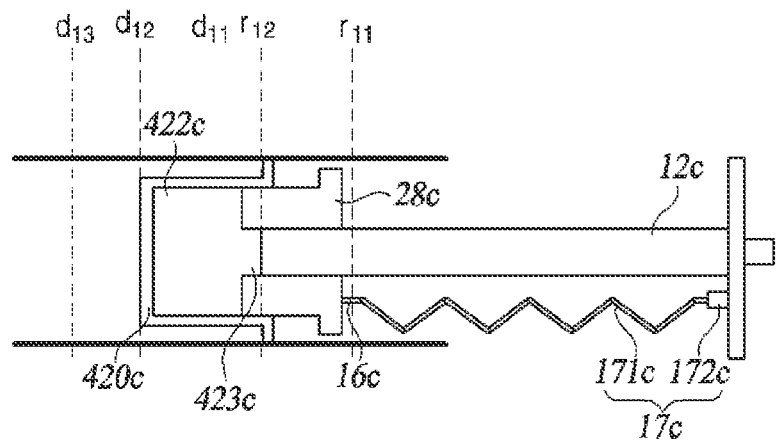
FIG. 23B shows an operation at a time point $t_{28}$ of FIG. 22.
Figure 23C:
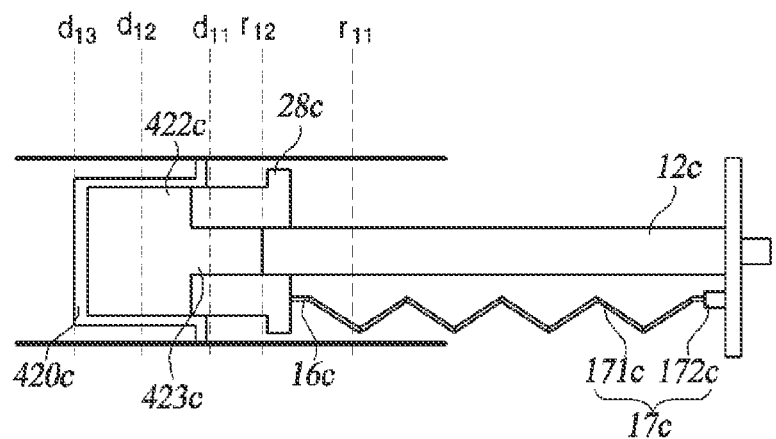
FIG. 23C shows an operation at a time point $t_{24}$ of FIG. 22.

FIG. 23A shows operation at a start point of FIG. 22, FIG. 23B shows operation at a time point $t_{18}$ of FIG. 22, and FIG. 23C shows operation at a time point $t_{24}$ of FIG. 22.

The start point of FIG. 22 is a point $r_{11}$ at which a driver starts to depress the pedal 11c, and total pedal force $L_2$ is generated at the start point. Since the operating rod 12c is spaced apart from the center portion 423c of the reaction disc 420c, pedal force $L_3$ by the reaction force of the reaction disc 420c is not generated yet. Only the pedal force $L_2$ of the elastomer increases in the period between the start point, which is the initial point at which the driver starts to depress the pedal 11c, and the time point $t_{10}$.

In the period between the time points $t_{10}$ and $t_{11}$, the pedal force $L_8$ by the reaction force of the reaction disc 420c increases. The motor piston 28c moves toward the master cylinder 14c and presses the disc unit 42c, whereby a center portion 423c protruding at the center of the reaction disc 420c is formed. The center portion 423c comes in contact with the operating rod 12c at the time point $t_{10}$. As the pressed degree of the disc unit 42c increases, pedal is provided to the driver through the operating rod 12c due to the reaction force of the reaction disc 420c. Accordingly, the total pedal force $L_1$ corresponding to the depression amount of the pedal 11c increases in this period. However, when the motor piston 28c moves toward the master cylinder 14c and the elastomer 17c expands, the increase of the pedal force by the elastomer 17c may be smaller than the increase of the total pedal force.

A braking force is not generated in the period between the start point and the time point $t_{11}$.

The period between the time points $t_{11}$ and $t_{12}$ is a period in which the depression amount of the pedal 11c increases and a corresponding braking force is generated. FIG. 22 shows a case in which the control unit 50c starts the regenerative braking mode and brakes a vehicle, and in this period, a hydraulic braking force $L_5$ is not generated and a regenerative braking force $L_4$ gradually increases.

The period between the time points $t_{12}$ and $t_{13}$ is a period in which the depression amount of the pedal 11c is maintained. In this period, since the magnitude of a braking force requested by the driver does not change, the regenerative braking force $L_4$ is also maintained at a constant level. At the time point $t_{13}$, as in FIG. 23B, the motor piston 28c presses the disc unit 42c, so the displacement of the disc unit 42c moves from $d_{11}$ to $d_{12}$ shown in FIG. 23, but does not move such that a hydraulic braking force $L_5$ is generated.

The period between the times points $t_{13}$ and $t_{14}$ is a period in which the control unit 50c stops the regenerative braking mode and starts the hydraulic braking mode. In this period, the regenerative braking force decreases and the hydraulic braking force $L_5$ increases by the reduced braking force. The period between the time points $t_{13}$ and $t_{14}$ is a period in which the hydraulic braking force $L_5$ increases. The brake system according to the third embodiment of the present disclosure presses the master cylinder 14c by moving the motor piston 28c from $d_{12}$ to $d_{13}$ by driving the electric booster unit 20c to generate a hydraulic braking force in the period between the time points $t_{13}$ and $t_{14}$ When the time point $t_{14}$ is reached, as shown in FIG. 23C, the displacement of the operating rod 12c is not changed at $r_{12}$ and only the displacement of the motor piston 28c changes.

Figure 27A:
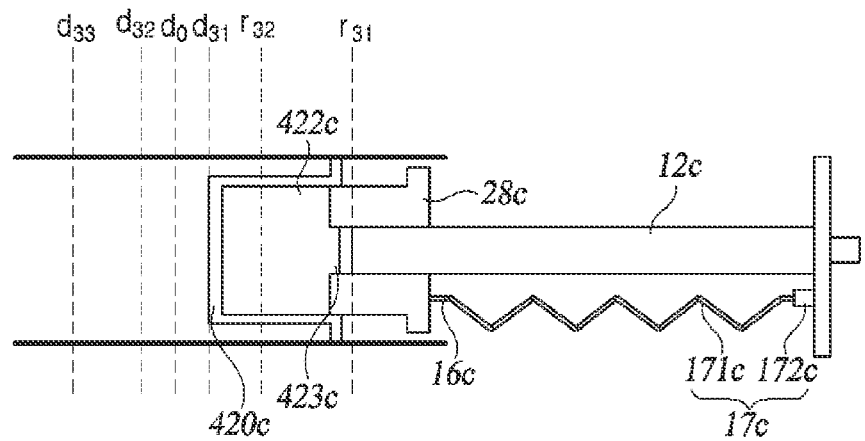
FIG. 27A shows an operation at a start point of FIG. 26.
Figure 27B:
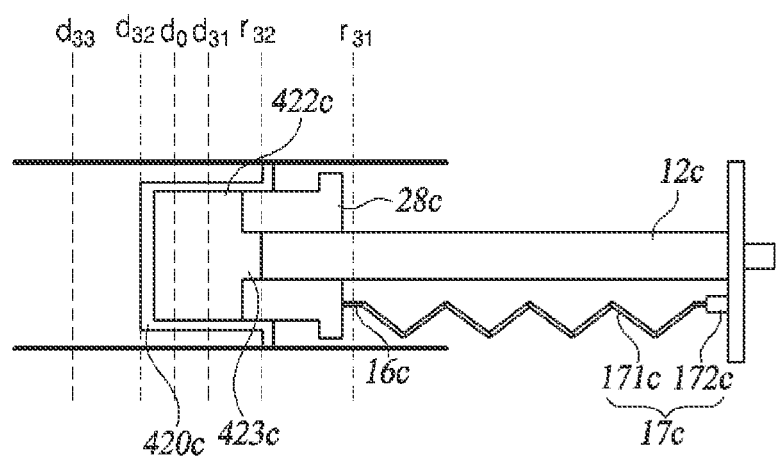
FIG. 27B shows an operation at a time point $t_{34}$ of FIG. 26.
Figure 27C:
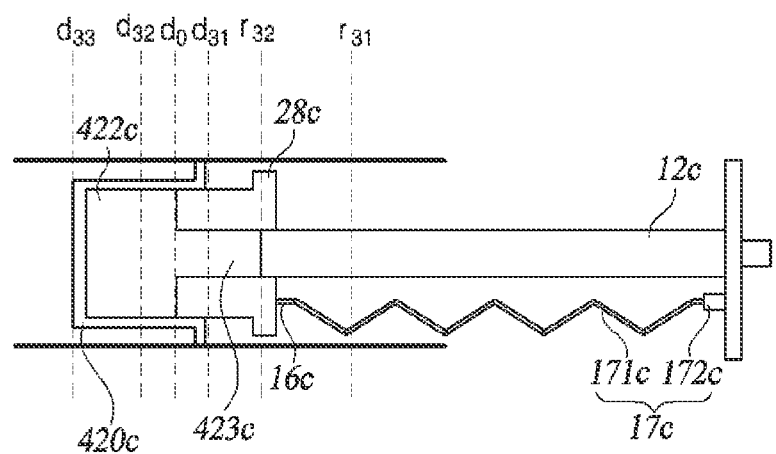
FIG. 27C shows an operation at a time point $t_{35}$ of FIG. 26.

When the pedal force that a driver feels in FIG. 23B is $F_1$ and the pedal force that a driver feels in FIG. 23C is $F_2$, $F_1$ and $F_2$ satisfy Equation 1.

$$F_1 = P_{rd1}A_1 + KX_1 \qquad \text{[Equation 1]}$$

$$F_2 = P_{rd2}A_2 + KX_2$$

where $P_{rd1}$ is pressure that is applied to the operating rod 12c by the reaction disc 420c in FIG. 23B, A is the contact area between the reaction disc 420c and the operating rod 12c in FIG. 23B, K is a young's modulus of the elastomer 17c, $X_1$ is a compressed distance of the elastomer 17c in FIG. 23B, is pressure that is applied to the operating rod 12c by the reaction disc 420c, and $X_2$ is a compressed distance of the elastomer 17c in FIG. 27C.

The displacement of the operating rod 12c is maintained at the point $r_{12}$ but the displacement of the motor piston 28c moves from the point $d_{12}$ to the point $d_{13}$ between FIG. 23B and FIG. 23C, so $X_1 > X_2$. Accordingly, $KX_1 > KX_2$.

Since the hydraulic braking force should be increased by the decreased regenerative braking force in FIG. 23C, the motor piston 28c should be further moved toward the mastic cylinder 14c. Since the motor piston 28c presses the reaction disc 420c stronger with the displacement of the operating rod 12c maintained, the center portion 423c of the reaction disc 420c made of an elastic material further protrudes and the reaction disc 420c has larger pressure ($P_{rd1} < P_{rd2}$). In this case, even though the degree of protrusion of the center portion 423c of the reaction disc 420c increases, the contact area between the center portion 423c and the operating rod 12c does not change.

Since $P_{rd1} < P_{rd2}$ but $KX_1 > KX_2$, $F_1 \approx F_2$. Accordingly, a driver can feel pedal force that is not disconnected even while the regenerative braking force decreases and the hydraulic braking force increases.

In the present disclosure, since the reaction disc 420c is made of an elastic material, the degree of protrusion and the area being in contact with the operating rod 12c may depend on the degree of elasticity of the reaction disc 420c. It is preferable that the reaction disc 420c is designed to satisfy $F_1 \approx F_2$ such that there is no difference between pedal force $F_1$ and $F_2$ that a driver feels even while a regenerative braking force decreases and a hydraulic braking force increases.

Figure 24:
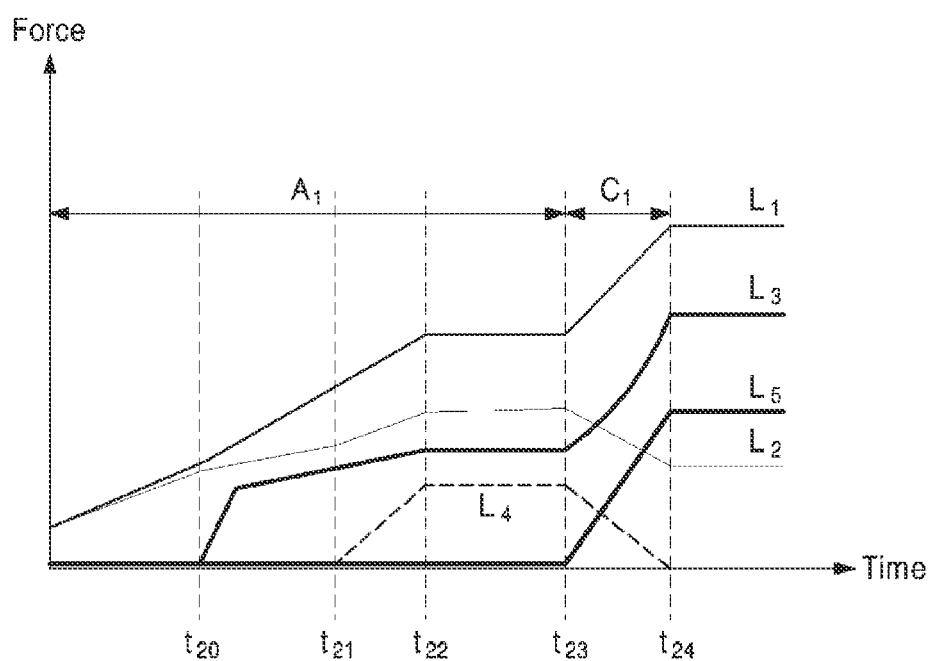
FIG. 24 is a graph illustrating the relationship between total pedal force, pedal force of an elastomer, pedal force of a reaction disc, a regenerative braking force, and a hydraulic braking force over time when a depression amount increases while regenerative braking is stopped in a situation in which a control unit performs only regenerative braking during braking.

FIG. 24 is a graph illustrating the relationship between total pedal force, pedal force of an elastomer, pedal force of a reaction disc, a regenerative braking force, and hydraulic braking force over time when a depression amount increases while regenerative braking is stopped in a situation in which a control unit performs only regenerative braking during braking. FIG. 25 is a schematic diagram illustrating an operation at a start point and time points $t_{23}$ and $t_{24}$ in FIG. 24.

Figure 25A:
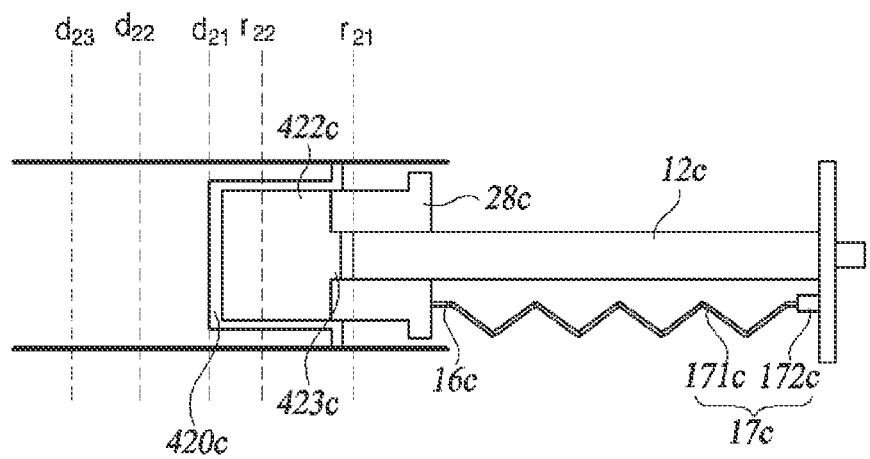
FIG. 25A shows an operation at a start point of FIG. 24.
Figure 25B:
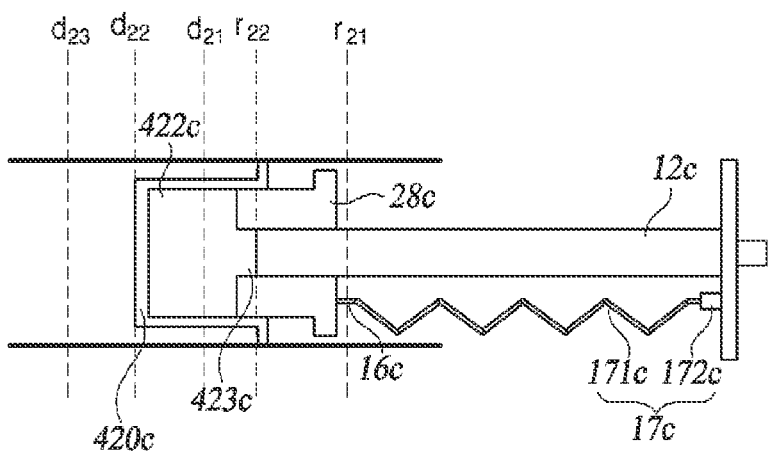
FIG. 25B shows an operation at a time point $t_{23}$ of FIG. 24.
Figure 25C:
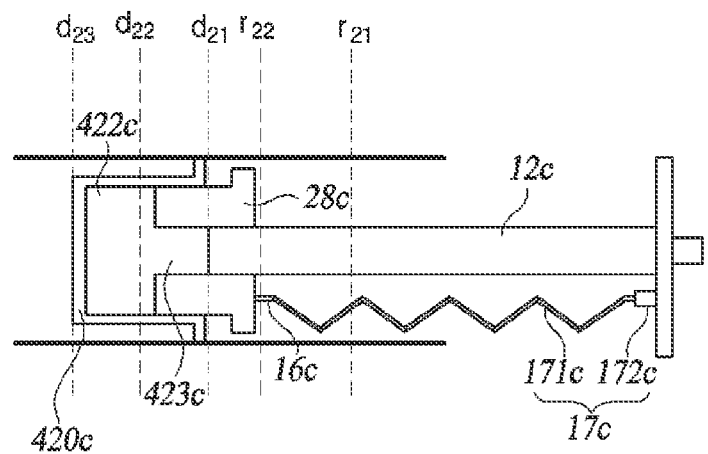
FIG. 25C shows an operation at a time point $t_{24}$ of FIG. 24.

FIG. 25A shows operation at a start point of FIG. 24, FIG. 25B shows operation at a time point $t_{23}$ of FIG. 24, and FIG. 25C shows operation at a time point $t_{24}$ of FIG. 24. The operation of the brake system in the period between the start point of the graph and the time point $t_{23}$ shown in FIG. 24 is similar to the operation in the period between the start point of the graph and the time point $t_{23}$ shown in FIG. 22, so it is not described below.

At the time point $t_{23}$, the control unit 50c stops the regenerative braking mode and starts to set the hydraulic braking mode. The regenerative braking force $L_4$ decreases and the hydraulic braking force $L_5$ increases in the period between the time points $t_{23}$ and $t_{24}$, but a driver increases the depression amount in this period, as shown in FIG. 24, so the requested hydraulic braking force $L_3$ is larger than the existing maximum regenerative braking force $L_4$.

The increase of the hydraulic braking force $L_5$ is larger in the period between the time points $t_{23}$ and $t_{24}$ of FIG. 24 than the period between the time points $t_{13}$ and $t_{14}$ of FIG. 22.

According to the brake system of the third embodiment of the present disclosure, a driver does not feel disconnection of depression even in this case. This is described in detail hereafter.

As shown in FIG. 25B and FIG. 25C, as a driver increases a depression amount, the displacement of the operating rod 12c moves from $r_{22}r_{23}$. The motor piston 28c is also driven by the electric booster unit 20c and presses the disc unit 42c, so the disc unit 42c presses the master cylinder 14c while the displacement thereof moves from $d_{22}$ to $d_{23}$, whereby a hydraulic pressure is generated. As the pressure that is applied to the reaction disc 420c gradually increases, the center portion 423c further protrudes and the pressure applied to the operating rod 12c increases due to a corresponding reaction force. As a result, the magnitude of the pedal force $L_3$ against the reaction force of the reaction disc 420c increases, but the elastomer 17c expands, so the magnitude of the pedal force $L_2$ by the elastomer 17c decreases. The principle of Equation 1 is intactly applied to this case, so a driver may not feel disconnection of depression even if the hydraulic change in the master cylinder 14c changes. That is, the motor piston 28c presses the reaction disc 420c, so the pedal force $L_3$ of the reaction disc 420c increases. Further, the motor piston 28c moves toward the master cylinder 14c, so the elastomer 17c expands and the pedal force $L_2$ of the elastomer 17c decreases. Accordingly, the driver does not feel disconnection of pedal force.

Figure 26:
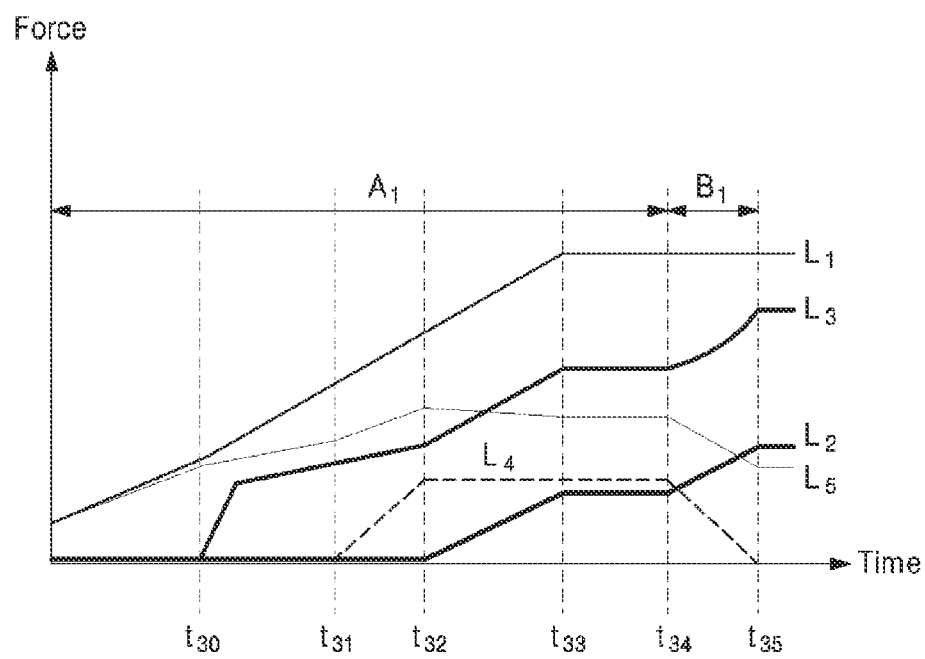
FIG. 26 is a graph illustrating the relationship between total pedal force, pedal force of an elastomer, pedal force of a reaction disc, a regenerative braking force, and a hydraulic braking force over time when regenerative braking is stopped in a situation in which a control unit performs regenerative braking and hydraulic braking during braking.

FIG. 26 is a graph illustrating the relationship between total pedal force, pedal force of an elastomer, pedal force of a reaction disc, a regenerative braking force, and hydraulic braking force over time when regenerative braking is stopped in a situation in which a control unit performs regenerative braking and hydraulic braking during braking. FIG. 27 is a schematic diagram illustrating an operation at a start point and time points $t_{34}$ and $t_{35}$ in FIG. 26.

FIG. 27A shows operation at a start point of FIG. 26, FIG. 27B shows operation at a time point $t_{34}$ of FIG. 26, and FIG. 27C shows operation at a time point $t_{35}$ of FIG. 26.

The operation for generating pedal force of the brake system in the period between the start point of the graph and the time point $t_{32}$ shown in FIG. 26 is similar to the operation in the period between the start point of the graph and the time point $t_{12}$ shown in FIG. 22, so it is not described below.

At the start point of FIG. 26 is a point at which a driver starts to depress the pedal 11c, and, at this point, the operating rod 12c is positioned at $r_{31}$ and total pedal force $L_1$ is generated. Since the operating rod 12c is spaced apart from the center portion 423c of the reaction disc 420c, pedal force $L_3$ by the reaction force of the reaction disc 420c is not generated.

A braking force is not generated in the period between the time points $t_{30}$ and $t_{31}$ that are time points at which the driver depresses the pedal 11c. In this period, pedal force $L_2$ that is generated by compression of the elastomer 17c and contact of the reaction disc 420c increases.

The period between the time points $t_{31}$ and $t_{32}$ is a period in which the depression amount of the pedal 11c increases and a corresponding braking force is generated. FIG. 26 shows a case in which the control unit 50c starts the regenerative braking mode first and brakes a vehicle, and in this period, a hydraulic braking force $L_5$ is not generated and a regenerative braking force $L_4$ gradually increases.

The period between the time points $t_{32}$ and $t_{33}$ is a period in which the control unit 50c determines that the hydraulic braking mode should be started, for example, the driver should further depress the pedal $11c$, and generates the hydraulic braking force $L_5$. In this period, the regenerative braking force $L_4$ is maintained, but the electric booster unit $20c$ is driven and presses the motor piston $28c$, thereby increasing hydraulic pressure that is supplied to the plurality of wheel brakes (not shown). In this process, the operating rod $12c$ further moves toward the master cylinder $14c$, thereby pressing the protruding center portion $423c$ of the reaction disc $420c$. The operating rod $12c$ comes in contact with the center portion $423c$ of the reaction disc $420c$, so the driver additionally feels pedal force $L_3$ of the reaction disc $420c$. In this case, the total pedal force $L_1$ is the sum of the pedal force $L_2$ of the elastomer $17c$ and the pedal force $L_3$ of the reaction disc $420c$.

The period between the time points $t_{33}$ and $t_{34}$ is a period in which the depression amount of the pedal $11c$ is maintained. In this period, since the magnitude of a braking force requested by the driver does not change, the regenerative braking force $L_4$ and the hydraulic braking force $L_5$ are also maintained at a constant level. At the time point $t_{34}$ as in FIG. 27B, the motor piston $28c$ presses the disc unit $42c$, so the displacement of the disc unit $42c$ moves to $d_{32}$ shown in FIG. 27 and passes through the point $d_0$ that is a point at which the hydraulic braking force $L_5$ starts to be generated. By pressing of the motor piston $28c$, the center portion $423c$ of the reaction disc $420c$ is further protrudes than FIG. 27A, and comes in contact with the operating rod $12c$. In this period, as the driver increases the depression amount to form the hydraulic braking force $L_5$, the displacement of the operating rod $12c$ moves to $r_{32}$.

The period between the times points $t_{34}$ and $t_{35}$ is a period in which the control unit $50c$ stops the regenerative braking mode and increases the hydraulic braking force by the decreased regenerative braking force.

The brake system according to the third embodiment of the present disclosure further presses the master cylinder $14c$ by moving the motor piston $28c$ from $d_{32}$ to $d_{33}$ by driving the electric booster unit $20c$ to increase the hydraulic braking force in the period between the time points $t_{34}$ and $t_{35}$. When the time point $t_{35}$ is reached, as shown in FIG. 27C, the displacement of the operating rod $12c$ is not changed at $r_{32}$ and only the displacement of the motor piston $28c$ changes. Since the operating rod $12c$ keeps in contact with the reaction disc $420c$, the total pedal force $L_1$ is influenced by the pedal force $L_2$ of the elastomer $17c$ and the pedal force $L_3$ of the reaction disc $420c$. However, even though influenced by the pedal force $L_3$ of the reaction disc $420c$, the magnitude of the total pedal force $L_1$ does not change like that described with reference to Equation 1. That is, the motor piston $28c$ presses the reaction disc $420c$, so the pedal force $L_3$ of the reaction disc $420c$ increases. Further, the motor piston $28c$ moves toward the master cylinder $14c$, so the elastomer $17c$ expands and the pedal force $L_2$ of the elastomer $17c$ decreases. Accordingly, the driver does not feel disconnection of pedal force.

Figure 28:
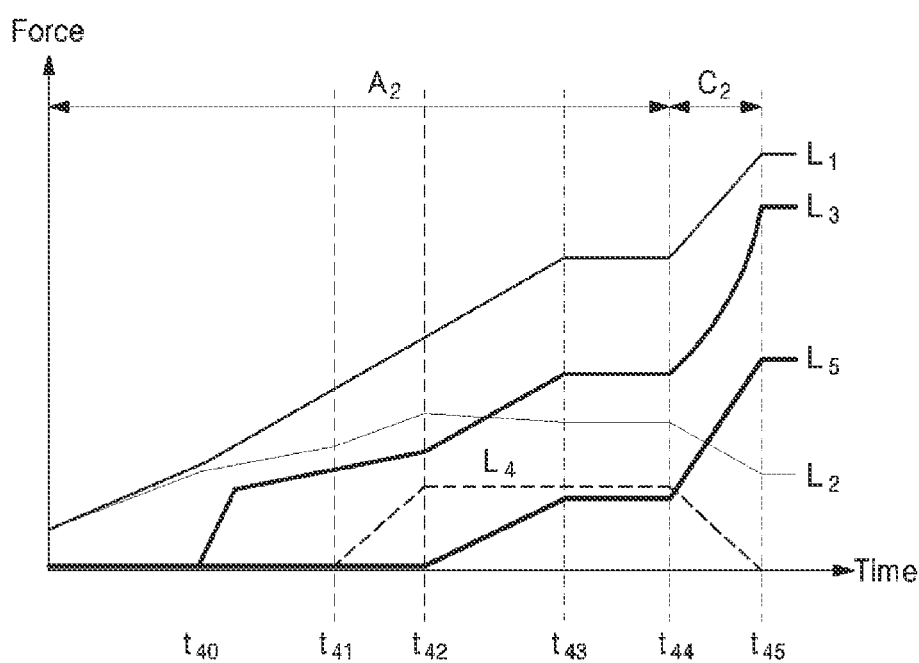
FIG. 28 is a graph illustrating the relationship between total pedal force, pedal force of an elastomer, pedal force of a reaction disc, a regenerative braking force, and a hydraulic braking force over time when a depression amount increases while regenerative braking is stopped in a situation in which a control unit performs both regenerative braking and hydraulic braking during braking.

FIG. 28 is a graph illustrating the relationship between total pedal force, pedal force of an elastomer, pedal force of a reaction disc, a regenerative braking force, and hydraulic braking force over time when a depression amount increases while regenerative braking is stopped in a situation in which a control unit performs both regenerative braking and hydraulic braking during braking. FIG. 29 is a schematic diagram illustrating an operation at a start point and time points $t_{44}$ and $t_{45}$ in FIG. 28.

Figure 29A:
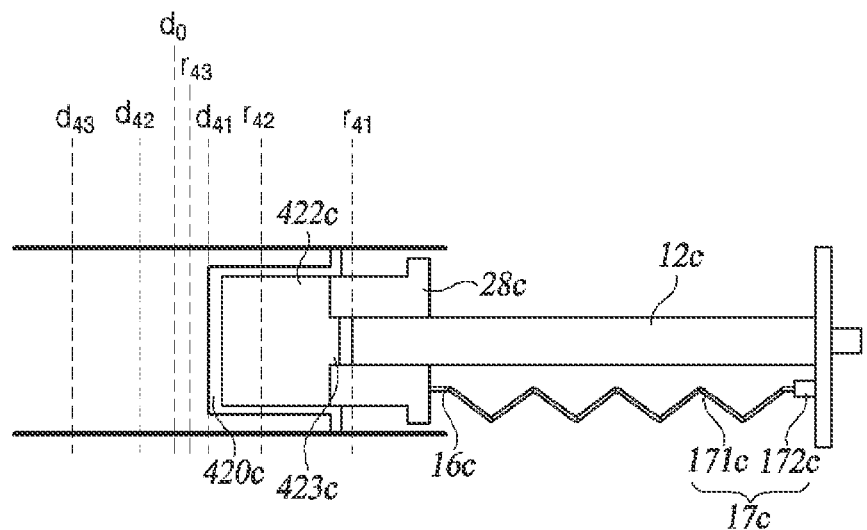
FIG. 29A shows an operation at a start point of FIG. 28.
Figure 29B:
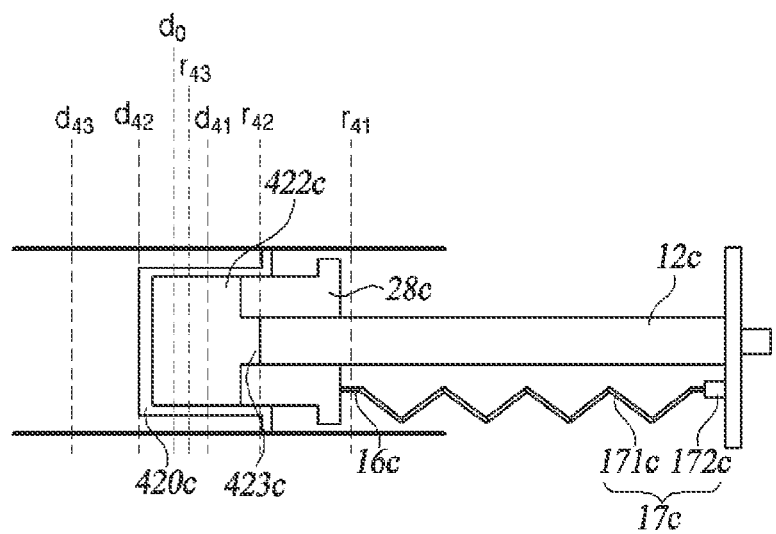
FIG. 29B shows an operation at a time point $t_{44}$ of FIG. 28.
Figure 29C:
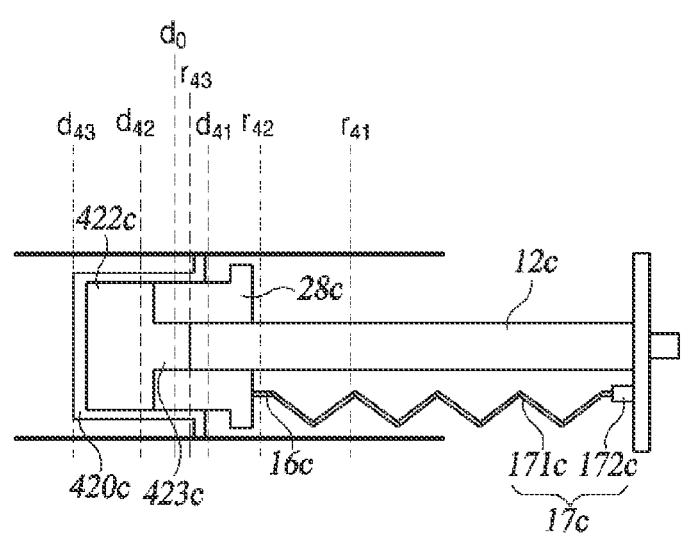
FIG. 29C shows an operation at a time point $t_{48}$ of FIG. 28.

FIG. 29A shows operation at a start point of FIG. 28, FIG. 29B shows operation at a time point $t_{44}$ of FIG. 28, and FIG. 29C shows operation at a time point $t_{45}$ of FIG. 28. The operation of the brake system in the period between the start point of the graph and the time point $t_{44}$ shown in FIG. 28 is similar to the operation in the period between the start point of the graph and the time point $t_{34}$ shown in FIG. 26, so it is not described below.

At the time point $t_{44}$, the control unit $50c$ drives the electric booster unit $20c$ to stop the regenerative braking mode and increase the hydraulic braking force $L_5$. The regenerative braking force $L_4$ decreases and the hydraulic braking force $L_5$ increases in the period between the time points $t_{44}$ and $t_{45}$, but a driver increases the depression amount in this period, as shown in FIG. 28, so the requested hydraulic braking force $L_5$ is larger than the existing maximum regenerative braking force $L_4$.

The increase of the hydraulic braking force $L_5$ is larger in the period between the time points $t_{44}$ and $t_{45}$ of FIG. 28 than the period between the time points $t_{34}$ and $t_{35}$ of FIG. 26.

According to the brake system of the third embodiment of the present disclosure, a driver does not feel disconnection of depression even in this case.

As shown in FIG. 29B and FIG. 29C, as a driver increases a depression amount, the displacement of the operating rod $12c$ moves from $r_{42}r_{43}$. The motor piston $28c$ is also driven by the electric booster unit $20c$ and presses the reaction disc $420c$, so the disc unit $42c$ presses the master cylinder $14c$ while the displacement thereof moves from $d_{42}$ to $d_{43}$, whereby a hydraulic pressure is generated. During driving from FIG. 29B to FIG. 29C, the operating rod $12c$ keeps in contact with the center portion $423c$ of the reaction disc $420c$, but the pedal force that the driver feels little changes, as described with reference to Equations. Accordingly, even though the hydraulic pressure in the master cylinder $14c$ changes, the driver does not feel disconnection of depression.

Figure 30:
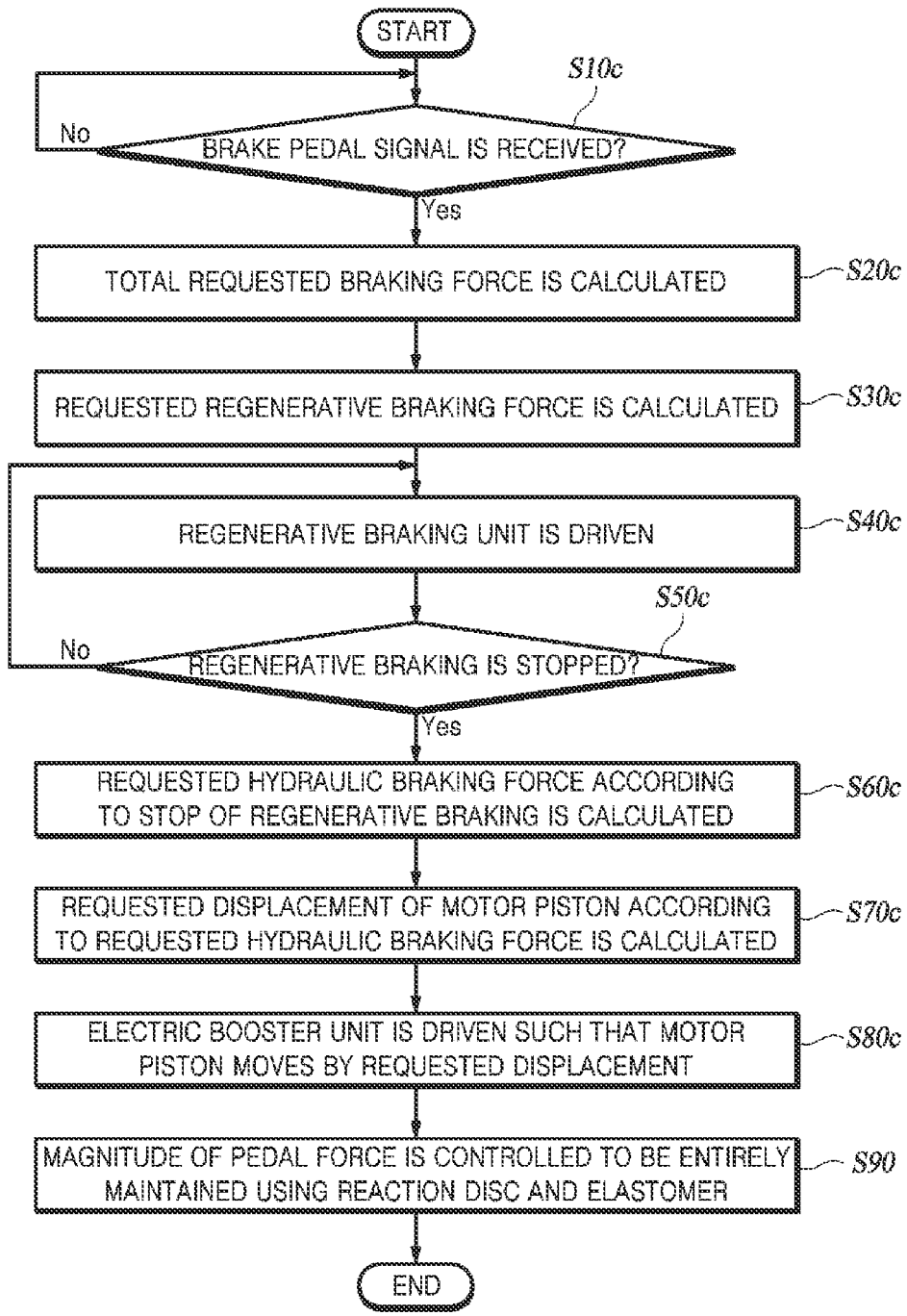
FIG. 30 is a flowchart of a method of controlling a brake system according to a third embodiment of the present disclosure.

FIG. 30 is a flowchart of a method of controlling a brake system according to a third embodiment of the present disclosure. The flowchart of FIG. 30 shows some of many braking methods, and the control unit $50c$ does not necessarily include the algorithm of FIG. 30 and may include a plurality of braking algorithms including the algorithm of FIG. 30. FIG. 30 is a flowchart constructed under the assumption that a regenerative braking unit is driven, in which the control unit $30c$ may include other methods of braking a vehicle using only a hydraulic braking force.

The control unit $50c$ receives a brake pedal signal (S$10c$). That is, the control unit $50c$ receives a signal from the brake pedal $11c$ to check whether a driver depresses the pedal $11c$. When not receiving a brake pedal signal, the control unit $50c$ determines that a braking situation does not occur, and does not perform the control process of FIG. 30.

When receiving a braking signal, the control unit $50c$ calculate a total requested braking force (S$20c$). The total requested braking force is determined on the basis of the depression amount of the pedal $11c$ by the driver, and may be determined on the basis of additional determination by a control unit $50c$ having a self-driving function. When the driver depresses the pedal $11c$, the control unit $50c$ calculates a total requested braking force for braking the vehicle on the basis of the depression amount of the pedal $11c$ that is measured by a pedal travel sensor (not shown).

The control unit $50c$ calculates a requested regenerative braking force on the basis of the total requested braking force (S$20c$). After calculating the requested regenerative braking force, the control unit $50c$ drives the regenerative braking unit (not shown) on the basis of the calculated requested regenerative braking force (S$40c$).

While the regenerative braking unit (not shown) is driven, the control unit 50c determines whether it is required to stop regenerative braking (S50c). The control unit 50c may determine to stop regenerative braking by itself, but may determine whether it is required to stop regenerative braking using a regenerative braking stop signal that is received from the outside.

When determining that regenerative braking is stopped, the control unit 50c calculates a requested hydraulic braking force due to stop of regenerative braking (S60c). When the control unit 50c stops the regenerative braking mode, the regenerative braking force decreases, so the control unit 50c senses the magnitude of the regenerative braking force and calculates a requested hydraulic braking force for compensation corresponding to the sensed braking force.

The control unit 50c calculates requested displacement of the motor piston 28c according to the requested hydraulic braking force (S70c). The requested displacement of the motor piston 28c is determined on the basis of the displacement of the motor piston 28c at the point in time when the control unit 50c starts to stop regenerative braking.

The control unit 50c derives the electric booster unit 20c so that the motor piston 28c moves by requested displacement (S80c). The control unit 40c moves the motor piston 28c toward the master cylinder 14c to press the reaction disc 420c by driving the electric booster unit 20c. In this case, the reaction disc 420c is made of an elastic material and the motor piston 28c may come in contact with the outer edge of the reaction disc 420c.

While the motor piston 28c moves by the requested displacement, the control unit 50c performs control such that the magnitude of the pedal force that the driver feels is entirely maintained using the elastomer 17c and the reaction disc 420c (S90c).

In this case, the first end of the elastomer 17c is in contact with the brake pedal 11c and the second end is in contact with a portion of the electric booster unit 20c, so when the motor piston 14c moves toward the master cylinder 14c, the pedal force of the driver can be reduced.

As the motor piston 28c presses the reaction disc 420c, the center portion 423c of the reaction disc 420c can protrude toward the operating rod 12c. When the protruding reaction disc 420c comes in contact with the operation rod 12c, the reaction disc provides a reaction force to the operation rod 12d, in which the reaction force is a portion of the pedal force that the driver feels. According to the present disclosure, as described with reference to Equation, even though the reaction disc 420c and the operating rod 12c come in contact with each other, there is no disconnection of depression in the period in which the regenerative braking force decreases and the hydraulic braking force increases.

The method ends this algorithm after finishing S90c.

The braking logic of FIGS. 22 to 30 is an example, the present disclosure does not decrease disconnection of depression by a driver using only the braking logic shown in the figures, and there is an effect the present disclosure can prevent disconnection of depression by a driver using any braking logics.

What is claimed is:

1. A braking system configured to, when braking a vehicle, perform one or more of cooperative braking or a combination of regenerative braking and hydraulic braking, the braking system comprising:
   a master cylinder;
   a reaction disc made of an elastic material and configured to compress the master cylinder;
   a rod assembly comprising an operating rod whose displacement is adjusted based on an amount of a force applied on a brake pedal, a fixing unit, and a spring whose one end abuts a part of the operating rod and the other end abuts the fixing unit;
   an electric booster comprising a motor piston configured to compress at least a part of the reaction disc, for compressing the master cylinder by adjusting a displacement of the motor piston; and
   an electric controller configured to control the electric booster and perform control to brake the vehicle by using one or more of the regenerative braking and the hydraulic braking,
   wherein the motor piston is configured to compress an outer perimeter of the reaction disc to cause a central part of the reaction disc to protrude toward the operating rod depending on a degree of compression so as to form a protruding portion at the central part of the reaction disc, such that the operating rod is configured to compress the protruding portion of the reaction disc, and
   when the protruding portion abuts the operating rod as the brake pedal is pressed, pressure applied from the reaction disc to the operating rod increases with increasing pressure applied on the reaction disc by the motor piston, and at the same time, an area of contact between the reaction disc and the operating rod decreases.

2. The braking system of claim 1, wherein, the electric controller brakes the vehicle by performing at least the regenerative braking among the regenerative braking and the hydraulic braking, and then the electric controller drives the electric booster so as to compress the reaction disc when disabling the regenerative braking.

3. The braking system of claim 1, wherein, when hydraulic pressure in the master cylinder is maintained, if the motor piston moves further toward the reaction disc than the operating rod, an amount of a pedal force is maintained regardless of how much the master cylinder is compressed by the reaction disc.

4. The braking system of claim 1, further comprising a damper connecting the one end of the spring to the part of the operating rod.

5. A method of controlling a braking system configured to, when braking a vehicle, one or more of perform cooperative braking and a combination of regenerative braking and hydraulic braking, the method comprising:
   (a) when a pedal is applied, calculating a total braking force required to brake the vehicle based on a stroke of the pedal measured by a pedal travel sensor;
   (b) calculating a required regenerative braking force based on the total braking force required;
   (c) driving a regenerative braking unit to provide a braking force according to the required regenerative braking force;
   (d) determining whether to stop the regenerative braking or not;
   (e) if it is determined that the regenerative braking needs to be stopped, calculating a required hydraulic braking force corresponding to stoppage of the regenerative braking;
   (f) calculating a required displacement of a motor piston corresponding to the required hydraulic braking force; and
   (g) driving an electric booster so as to compress an outer perimeter of a reaction disc by moving the motor piston according to the required displacement to cause a central part of the reaction disc to protrude toward an operating rod depending on a degree of compression so as to form a protruding portion at the central part of the reaction disc, such that the operating rod is configured to compress the protruding portion of the reaction disc, wherein when the protruding portion abuts the operating rod as the pedal is pressed, pressure applied from the reaction disc to the operating rod increases with increasing pressure applied on the reaction disc by the motor piston, and at the same time, an area of contact between the reaction disc and the operating rod decreases.

6. The method of claim 5, wherein the motor piston is made of an elastic material.

7. The method of claim 5, wherein, in the step (g), when the motor piston compresses the reaction disc, an amount of a formed reaction force is constant.

8. The method of claim 5, wherein, in the step (f), the required displacement is calculated based on whether the reaction disc abuts the operating rod whose displacement is adjusted based on an amount of a force applied on a brake pedal.

9. The method of claim 5, further comprising a step of performing controlling such that a magnitude of pedal force is entirely maintained using the reaction disc and a spring of which a first end is in contact with a brake pedal and a second end is in contact with a portion of the electric booster while the motor piston moves by the requested displacement.

10. A brake system configured to perform cooperative braking in which regenerative braking and hydraulic braking are both performed in a braking situation of a vehicle, the brake system comprising:
  a master cylinder;
  a reaction disc made of an elastic material and configured to press the master cylinder;
  an electric booster including a motor piston and a screw shaft configured to press the motor piston, and configured to press the master cylinder by adjusting a displacement of the motor piston;
  a rod assembly including an operating rod a displacement of which is adjusted in accordance with a depression amount of a brake pedal and further including a spring a first end of which is in contact with a portion of the operating rod and a second end of which is in contact with at least a portion of the electric booster; and
  a controller configured to control the electric booster and to perform control for braking the vehicle using one or more of the regenerative braking and the hydraulic braking,
  wherein the motor piston is configured to compress an outer perimeter of the reaction disc to cause a central part of the reaction disc to protrude toward the operating rod depending on a degree of compression so as to form a protruding portion at the central part of the reaction disc, such that the operating rod is configured to compress the protruding portion of the reaction disc, and
  when the protruding portion abuts the operating rod as the brake pedal is pressed, pressure applied from the reaction disc to the operating rod increases with increasing pressure applied on the reaction disc by the motor piston, and at the same time, an area of contact between the reaction disc and the operating rod decreases.

11. The brake system of claim 10, wherein the spring is in contact with the motor piston or the screw shaft of the electric booster.

12. The brake system of claim 11, wherein the screw shaft includes a first shaft configured to rotate and a second shaft configured to press the motor piston by converting a rotational motion of the first shaft into a straight motion, and the spring is in contact with the second shaft.

13. The brake system of claim 10, wherein when the controller brakes the vehicle by performing the one or more of the regenerative braking of the regenerative braking and the hydraulic braking, the controller drives the electric booster to press the reaction disc when stopping the regenerative braking.

* * * * *